US008973142B2

(12) United States Patent
Shulman et al.

(10) Patent No.: US 8,973,142 B2
(45) Date of Patent: Mar. 3, 2015

(54) COMPROMISED INSIDER HONEY POTS USING REVERSE HONEY TOKENS

(71) Applicant: Imperva Inc., Redwood Shores, CA (US)

(72) Inventors: Amichai Shulman, Tel Aviv (IL); Michael Cherny, Zikim (IL); Sagie Dulce, Hod HaSharon (IL)

(73) Assignee: Imperva, Inc., Redwood Shores, CA (US)

( * ) Notice: Subject to any disclaimer, the term of this patent is extended or adjusted under 35 U.S.C. 154(b) by 92 days.

(21) Appl. No.: 13/934,099

(22) Filed: Jul. 2, 2013

(65) Prior Publication Data

US 2015/0013006 A1 Jan. 8, 2015

(51) Int. Cl.
*G06F 12/14* (2006.01)
*H04L 29/06* (2006.01)

(52) U.S. Cl.
CPC .................................. *H04L 63/1408* (2013.01)
USPC ........ 726/23; 726/22; 726/26; 726/2; 726/14; 726/27; 455/410; 455/411; 705/51; 713/165

(58) Field of Classification Search
CPC ............ H04L 63/1491; H04L 63/1441; H04L 63/1416; H04L 63/0227; H04L 51/12; H04W 12/12; G06F 21/554
USPC ........ 726/22, 23, 26, 2, 14, 27; 455/410, 411; 705/51; 713/165
See application file for complete search history.

(56) References Cited

U.S. PATENT DOCUMENTS

| 7,831,522 | B1 | 11/2010 | Satish et al. | |
|---|---|---|---|---|
| 8,307,433 | B2 | 11/2012 | Yue et al. | |
| 2006/0101515 | A1 * | 5/2006 | Amoroso et al. | 726/23 |
| 2008/0022400 | A1 * | 1/2008 | Cohen et al. | 726/22 |
| 2008/0244692 | A1 | 10/2008 | Chang | |
| 2010/0077483 | A1 * | 3/2010 | Stolfo et al. | 726/24 |
| 2012/0233222 | A1 * | 9/2012 | Roesch | 707/812 |

FOREIGN PATENT DOCUMENTS

WO WO-2009055785 A2 4/2009

OTHER PUBLICATIONS

Spitzner (2003). Honeytokens: The Other Honeypot. Retrieved May 14, 2009 from Http://web.archive.org/web/20030811090852/http://www.securityfocus.*

(Continued)

*Primary Examiner* — Brian Shaw
(74) *Attorney, Agent, or Firm* — Blakely Sokoloff Taylor & Zafman, LLP

(57) ABSTRACT

According to one embodiment, a method for setting a trap to detect that an intruder has compromised a client end station (CES) in an attempt to gain unauthorized access to enterprise data provided by a server is described. The method includes causing a honey token to be placed on the CES secluded within a configuration repository, wherein the honey token is metadata and/or instructions indicating how applications can seemingly access the enterprise data but that is actually invalid, and the honey token is placed on the CES and not on the server. The method also includes causing attribute values to be installed on a security gateway for a security rule causing the security gateway to monitor network traffic for attempted use of the honey token, and to generate an alert when a set of one or more packets that include the honey token are received.

30 Claims, 13 Drawing Sheets

(56) References Cited

OTHER PUBLICATIONS

Bercovitch (2011). HoneyGen: an Automated Honeytokens Generator. 2011. IEEE.*

Bowen, Brian M., et al., "Designing Host and Network Sensors to Mitigate the Insider Threat", vol. 7 Issue 6, Nov. 2009, 14 pages, IEEE Educational Activities Department, Piscataway, NJ, USA.

Cenys, Antanas , "Development of Honeypot System Emulating Functions of Database Server", Semiconductor Physics Inst Vilnius (Lithuania), 2004, 6 pages., downloaded from: http://ftp.rta.nato.int/public//PubFullText/RTO/MP/RTO-MP-IST-041///MP-IST-041-09.pdf.

Maybury, Mark , et al., "Analysis and Detection of Malicious Insiders", Submitted to 2005 International Conference on Intelligence Analysis, 7 pages, McLean, VA.

Mokube, Iyatiti, et al., "Honeypots: Concepts, Approaches, and Challenges", In Proceedings of the 45th Annual Southeast Regional Conference, 2007, 6 pages, ACM.

Spitzner, Lance, "Honeytokens: The Other Honeypot", Updated Nov. 2, 2010, 5 pages, http://www.symantec.com/connect/articles/honeytokens-other-honeypot.

White, Jonathan, "Creating Personally Identifiable Honeytokens", In Innovations and Advances in Computer Sciences and Engineering, 2010, 6 pages, Springer Netherlands.

* cited by examiner

Fig. 4

| REVERSE HONEY TOKENS TYPES 400 | DATA SOURCE NAME (DSN) 306 | APPLICATION CONFIGURATION FILE 308 | APP. CONFIGURATION - INITIALIZATION (INI) FILE 310 | BROWSER LOCAL STORAGE 312 | O/S CONFIG. (E.G., WINDOWS REGISTRY) 314 | ••• |
|---|---|---|---|---|---|---|
| DB USERNAME 402 | ✓ | ✓ | ✓ |  | ✓ |  |
| DB PASSWORD 404 | ✓ | ✓ | ✓ |  | ✓ |  |
| DB NAME 406 | ✓ | ✓ | ✓ |  | ✓ |  |
| DB TABLE NAME 408 |  |  | ✓ |  | ✓ |  |
| DB QUERY 410 |  |  | ✓ |  | ✓ |  |
| NETWORK FOLDER PATH 412 |  |  | ✓ |  | ✓ |  |
| NETWORK FILE PATH 414 |  |  |  |  |  |  |
| APP USERNAME 416 |  |  |  | ✓ |  |  |
| APP PASSWORD 418 |  |  |  | ✓ |  |  |
| ••• |  |  |  |  |  |  |

CONFIG. REPOS. TYPES 401

Fig. 8

```
// To configure an Oracle 8 thin driver
<jdo-conf>
    <database name="ebiz" engine="oracle">
        <driver class-name="oracle.jdbc.driver.OracleDriver"
                url="jdbc:oracle:thin:@host:port:SID">
            <param name="user" value="trickuser" />
            <param name="password" value="trickpass" />
        </driver>
        ...
    </database>
    ...
</jdo-conf>
```

APPLICATION CONFIGURATION FILE PORTION 800

REVERSE HONEY TOKEN – "TRICK" USERNAME 804

REVERSE HONEY TOKEN – "TRICK" PASSWORD 806

```
// To configure a PostgreSQL 7.1 DataSource
<jdo-conf>
    <database name="ebiz" engine="oracle">
        <data-source class-name="org.postgresql.PostgreSQLDataSource">
            <param name="serverName" value="trickhost" />
            <param name="portNumber" value="trickport" />
            <param name="databaseName" value="trickdb" />
            <param name="user" value="trickuser" />
            <param name="password" value="trickpass" />
        </data-source>
        ...
    </database>
    ...
</jdo-conf>
```

APPLICATION CONFIGURATION FILE PORTION 802

REVERSE HONEY TOKEN – "TRICK" HOSTNAME 808

REVERSE HONEY TOKEN – "TRICK" PORT 810

REVERSE HONEY TOKEN – "TRICK" DATABASE NAME 812

REVERSE HONEY TOKEN – "TRICK" USERNAME 814

REVERSE HONEY TOKEN – "TRICK" PASSWORD 816

Fig. 9

APPLICATION
INITIALIZATION
(INI) FILE 900

FILENAME 901 app_xyz.ini

[production]
;Connections
database.doctrine.connections.master.collate = "utf8_unicode_ci"
database.doctrine.connections.master.charset = "utf8"
database.doctrine.connections.master.name = "my_production"
database.doctrine.connections.master.dsn = "mysql://fakeuser1:abrakadabra@dbhost/my_db"

RHT – "TRICK" USERNAME 902
RHT – "TRICK" PASSWORD 904

;Remote storage
system.documents.server = myserver  ⟵ RHT – "TRICK" SERVER NAME 910
system.documents.folder = /fakefolder  ⟵ RHT – "TRICK" DIRECTORY NAME/PATH 912
system.documents.index = /fakefolder/fakefile.idx  ⟵ RHT – "TRICK" FILE NAME/PATH 914
database.doctrine.caching.driver = Apc
database.doctrine.caching.query.enable = false
database.doctrine.caching.result.enable = false

RHT – "TRICK" HOST NAME 906
RHT – "TRICK" DATABASE NAME 908

[global]
system.init.mode = 'User Details'
system.init.populate = 'select decrypt(user_details,''AFC0445A'') from usr_details_tab where user_id = current_user'

RHT – "TRICK" DATABASE QUERY 916

Fig. 10

Table Name: moz_logins

| Column | Value |
|---|---|
| id (INTEGER) | 3 |
| hostname (TEXT) | https://humanresource |
| httpRealm (TEXT) | null |
| formSubmitURL (TEXT) | https://humanresource/fakeapp/login |
| usernameField (TEXT) | login |
| passwordField (TEXT) | passwd |
| encryptedUsername (TEXT) | MDIEEPgAAAAAEwFAYIKoZihvcNAwcECKyIczhvgLdSBAhnUM1nIz34chg |
| encryptedPassword (TEXT) | MDIEEPgAAAAAEwFAYIKorrQQ44fcNCKyczzzr22j34gdfAher34gs23gadg |
| guid (TEXT) | {f0865c2c-bc80-4d9e-8835-57d395ceb566} |
| encType (INTEGER) | 1 |
| timeCreated (INTEGER) | 1361268268089 |
| timeLastUsed (INTEGER) | 1361268268089 |
| timePasswordChanged (INTEGER) | 1361268268089 |
| timesUsed (INTEGER) | 1 |

BROWSER LOCAL STORAGE 1000

RHT – "TRICK" NETWORK ADDRESS 1002

RHT – "TRICK" ENCRYPTED USERNAME 1004

RHT – "TRICK" ENCRYPTED PASSWORD 1006

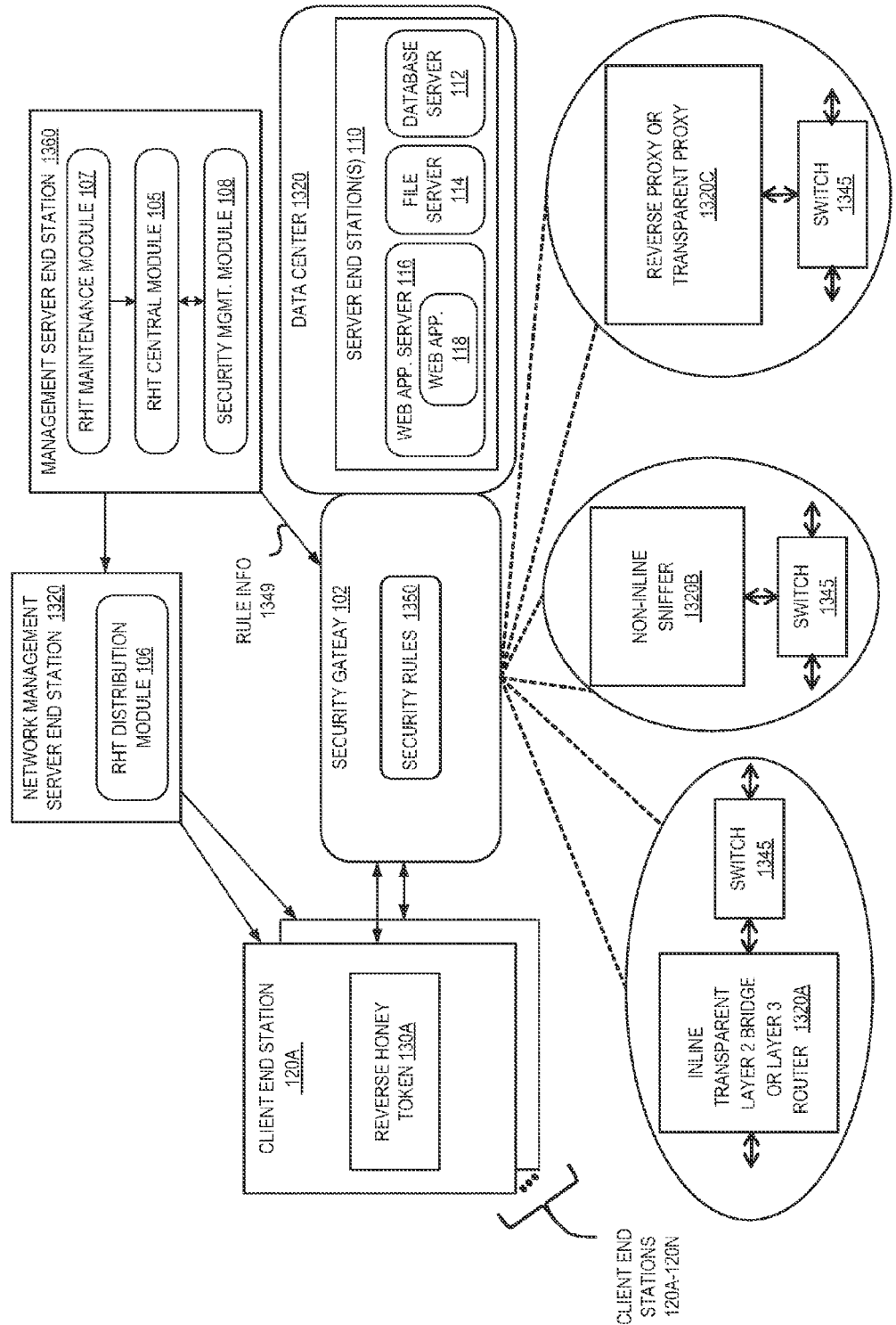

COMPROMISED INSIDER HONEY POTS USING REVERSE HONEY TOKENS

FIELD

Embodiments of the invention relate to the field of networking; and more specifically, to compromised insider detection using reverse honey tokens.

BACKGROUND

In the field of computer security, a honeypot is a term used to refer to a trap set to detect, deflect, or counteract attempts at an unauthorized use or malicious use of information systems. Generally, a honeypot is a decoy server or end station that appears to be part of a network, but is actually isolated and monitored, and which appears to contain information or a resource of value to attackers. Honeypots allow system operators to learn how attackers probe and attempt to gain access to end stations by maintaining a record of the attacker's activities. Further, honeypots may also gather evidence to be used to assist in the apprehension or prosecution of attackers.

In essence, honeypots are security resources that are intended to be probed, attacked, and compromised to allow for information about the attacker and the techniques of the attacker to be discovered. Production honeypots, as compared to research honeypots that seek to research threats being used, are primarily used within a production network (i.e., a network actively used for other purposes unrelated to threat detection) along with other production computing resources used by authorized users of the production network to improve the security of the production network. Honeypots may also be classified as either high-interaction or low-interaction. High-interaction honeypots typically utilize actual computing resources or software (e.g., a fully-installed and configured Unix system) to interact with potential attackers to provide a detailed and complete view of an attack, whereas low-interaction honeypots typically emulate one or more potentially vulnerable services or software (e.g., a standalone FTP server, or a standard Unix server with several typically attacked services, such as Finger, Telnet, and also FTP) and thus typically cannot become infected or compromised by an attack.

Some security approaches have turned to the use of "honey tokens" to attempt to detect intrusions. The term "honey token" refers to honeypots that are not servers or server end stations. Instead, honey tokens are typically pieces of information placed in server data repositories that are easy to detect when used, and are rarely (if ever) used by an authorized user. For example, a honey token could be a user account configured for a server or server end station that is not assigned to or used by any authorized user, or a database entry that would typically only be selected by a malicious query. Thus, a compromise of the server (i.e., a data breach) can be identified when a honey token is detected outside of the server's data repository, or when an access to the honey token within the server data repository occurs. For example, upon an attempted use of the user account honey token (e.g., an attempt to log on to a server) or an attempted access of the database entry including a honey token, an alarm can be issued to indicate the compromise.

Accordingly, the use of honeypots and honey tokens are fairly widespread in Web security, malware, and phishing research. However, it is almost impossible to effectively employ honeypots to guard against threats that are internal to an organization (as opposed to threats coming from outside an organization) because attackers can quickly distinguish honeypots from production servers by detecting a lack of network traffic directed to the honeypot from authorized internal users. Additionally, the use of honey tokens for detecting internal threats is problematic because an attacker may not ever use a discovered honey token despite having compromised a server (or may only use the honey token much later, after much damage has already been done), and thus the compromise will not be detected. Further, attempting to detect an access to a honey token stored within a server data repository will lead to many "false positive" compromise alerts. For example, a honey token placed within a database record may inadvertently be accessed by authorized users performing legitimate tasks (such as generating reports based upon historical information from the database), and the presence of this honey token may affect the accuracy of information obtained from the database and/or other applications that depend upon the integrity of the information in the database.

BRIEF DESCRIPTION OF THE DRAWINGS

The invention may best be understood by referring to the following description and accompanying drawings that are used to illustrate embodiments of the invention. In the drawings:

FIG. 4 is a diagram illustrating some exemplary reverse honey tokens that can be placed within some exemplary configuration repositories according to certain embodiments of the invention;

FIG. 8 is a diagram illustrating reverse honey tokens placed in different application configuration files according to certain embodiments of the invention;

FIG. 9 is a diagram illustrating reverse honey tokens placed in an application-specific initialization configuration repository according to certain embodiments of the invention;

FIG. 10 is a diagram illustrating reverse honey tokens placed in a browser local storage database configuration repository according to certain embodiments of the invention;

FIG. 13 illustrates exemplary deployment environments of a reverse honey token distribution module, reverse honey token maintenance module, reverse honey token central module, and security management module according to certain embodiments of the invention.

DESCRIPTION OF EMBODIMENTS

Figure 1:
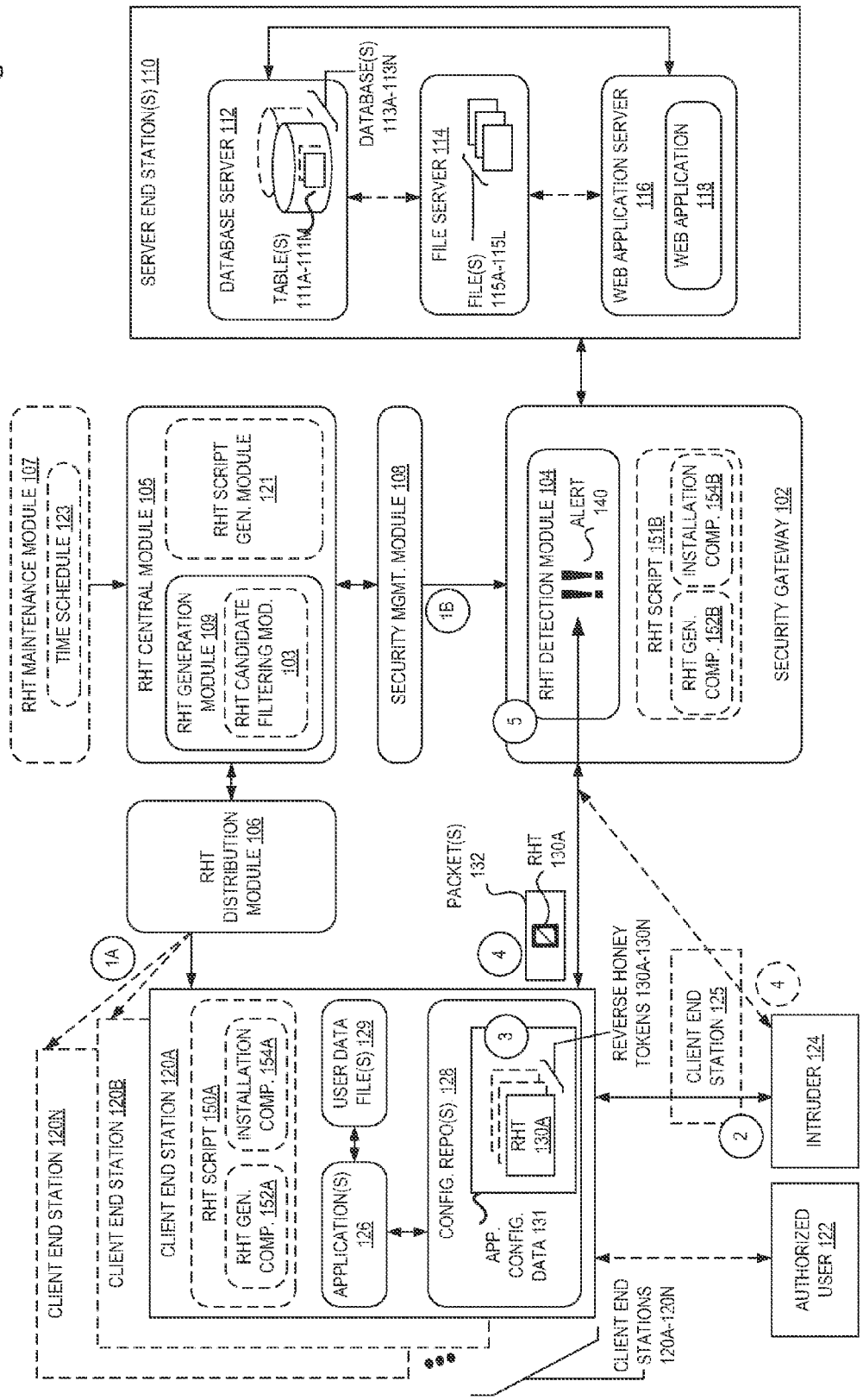
FIG. 1 is a block diagram illustrating setting a trap to detect if an intruder has compromised a client end station to gain unauthorized access to enterprise data provided by a server executing on a server end station according to certain embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

Embodiments of the invention provide for methods, systems, and apparatuses using reverse honey tokens to enable a "compromised insider" production honeypot and thereby detect if an intruder has compromised a client end station in an attempt to gain unauthorized access to enterprise data of one or more servers. In some embodiments of the invention, the attempted unauthorized access to enterprise data may be made by way of database accesses, web application accesses, and/or file server accesses; however, the invention may also be utilized for detecting unauthorized attempts to access print servers, mail servers, gaming servers, application servers, or any other type of server providing access to data or services.

As used herein, a "reverse" honey token, unlike a traditional honey token, is not placed (or does not exist) within a server or server end station. Instead, reverse honey tokens are placed in client end stations (e.g., into one or more user electronic devices within an enterprise) at locations such that the reverse honey tokens are not easily found or utilized by the authorized end users of the client end stations. These reverse honey tokens have an apparent use at a server that is typically not hosted by or co-located with that client end station. In some embodiments of the invention utilizing reverse honey tokens, the revere honey tokens are not even known by any server where those tokens have an apparent use, and thus would be treated as "invalid" by those servers. This provides a benefit in that the servers need not be informed of what reverse honey tokens exist, and even if an attacker discovers and attempts to use a reverse honey token, it will not allow the attacker any access to the server due to its invalidity.

According to embodiments of the invention, by detecting the attempted use of reverse honey tokens, a compromised client end station is able to be detected and the existence of an intruder is similarly able to be detected. Upon this detection, network traffic from the client attempting to utilize the reverse honey token can be monitored, regulated, and/or blocked from reaching the targeted server, the client end station determined to be compromised can be taken offline or repaired, and/or the client end station(s) responsible for transmitting the traffic having the reverse honey token can be sought, analyzed, and/or blocked from further network access. In embodiments of the invention, the reverse honey tokens are, in effect, hidden or secluded away from authorized users such that an authorized user is extremely unlikely to detect their presence or attempt to utilize them, but still be located such that a malevolent intruder is likely to detect them. For example, in some embodiments of the invention the reverse honey tokens are placed in application configuration data of configuration repositories, which are data structures utilized by applications—and not directly by end users—to configure the operation of the applications. The placement of reverse honey tokens in these configuration repositories significantly reduces a scenario where an authorized end user stumbles upon them (and attempts to use or modify them), but allows for malicious access of seemingly valid data. In some embodiments, after detection of the reverse honey token in traffic sent by an attacker seeking data or other information from a server, "fake" response data may be provided to the attacker to allow for further determination of the attacker's methods, identity, purpose, and/or location.

Embodiments of the invention utilizing reverse honey tokens, in contrast to most typical network security measures, can be easily deployed, with minimum or no risk to real data, provide an extremely low false positive rate, and can be used as effective defensive measure. Further, these embodiments do not confuse or disrupt an authorized user's use of the client end stations. Further, reverse honey tokens are very effective at detecting illegal data access originating from compromised end stations and thus are useful to mitigate one of the most prominent information threats that organizations face today.

FIG. 1 is a block diagram illustrating setting a trap to detect if an intruder has compromised a client end station to gain unauthorized access to enterprise data provided by a server executing on a server end station according to certain embodiments of the invention.

In FIG. 1, a set of one or more server end stations 110 execute or otherwise implement one or more servers providing access to data. In the embodiment depicted in this figure, the server end stations 110 enable a database server 112, a file server 114, and a web application server 116, although in other embodiments the set of server end stations 110 enable other types of servers, including but not limited to print servers, mail servers, gaming servers, and/or application servers.

A web application server 116 is system software (running on top of an operating system) executed by server hardware (e.g., server end stations 110) upon which web applications (e.g., web application 118) run. Web application servers may include a web server (e.g. Apache, Microsoft® Internet Information Server (IIS), nginx, lighttpd), which delivers web pages upon the request of HTTP clients (i.e., software executing on an end station) using HTTP, and may also include an application server that executes procedures (i.e., programs, routines, scripts) of a web application 118. Web application servers 116 typically include web server connectors, computer programming language libraries, runtime libraries, database connectors, and/or the administration code needed to deploy, configure, manage, and connect these components. Web applications 118 are computer software applications made up of one or more files including computer code that run on top of web application servers 116 and are written in a language the web application server 116 supports. Web applications 118 are typically designed to interact with HTTP clients by dynamically generating HTML and other content responsive to HTTP request messages sent by those HTTP clients. HTTP clients (e.g., non-illustrated software of any of client end stations 120A-120N) typically interact with web applications by transmitting HTTP request messages to web application servers 116, which execute portions of web applications 118 and return web application data in the form of HTTP response messages back to the HTTP clients, where the web application data may be rendered using a web browser. Thus, HTTP functions as a request-response protocol in a client-server computing model, where the web application servers 116 typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, Internet Protocol (IP) address, port, resource path, query string, and fragment identifier, which may be separated by periods and/or slashes. The original versions of HTTP—HTTP/0.9 and HTTP/1.0—were revised in IETF RFC 2616 as HTTP/1.1, which is in common use today. A new version of the HTTP protocol, HTTP/2.0, is currently being developed by the Hypertext Transfer Protocol Bis (httpbis) working group of the IETF and is based upon the SPDY protocol. As HTTP/2.0 is expected to similarly utilize HTTP clients and HTTP request messages, the invention discussed herein should largely (if not entirely) remain applicable to HTTP/2.0.

Database servers 112 are computer programs that provide database services to other computer programs or computers, typically adhering to the client-server model of communication. Many web applications 116 utilize database servers 112 (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients. However, other non-web applications may also utilize database servers 112, including but not limited to accounting software, other business software, or research software. Further, some applications allow for users to perform ad-hoc or defined queries (often using Structured Query Language (SQL)) using the database server 112. Database servers 112 typically store data using one or more databases 113A-113N, each including one or more tables 111A-111M (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column Thus, in some instances a database server 112 will receive a SQL query from a client (directly from a client process or client end station using a database protocol, or indirectly via a web application server that a client is interacting with), execute the SQL query using data stored in the set of one or more database tables 111A-111M of one or more of the databases 113A-113N, and potentially return a result (e.g., an indication of success, a value, one or more tuples, etc.).

A file server 114 is system software (e.g., running on top of an operating system, or as part of an operating system itself) typically executed by one or more server end stations 110 (each coupled to or including one or more storage devices) that allows applications or client end stations 120A-120N access to a file-system and/or files 115A-115L, typically allowing for the opening of files, reading of files, writing to files, and/or closing of files over a network. Further, while some file servers 114 provide file-level access to storage, other file servers 114 may provide block-level access to storage. File servers 114 typically operate using any number of remote file-system access protocols, which allow client processes to access and/or manipulate remote files from across the Internet or within a same enterprise network (e.g., a corporate Intranet). Examples of remote file-system access protocols include, but are not limited to, the Network File System (NFS), WebNFS, Server Message Block (SMB)/Common Internet File System (CIFS), SAMBA, File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

The set of server end stations 110 may be "protected" by a security gateway 102. Security gateways 102—such as firewalls, database firewalls, file system firewalls, and web application firewalls (WAFs)—are network security systems that protect software applications (e.g., web application servers 116) executing on electronic devices (e.g., server end stations 110) within a network by controlling the flow of network traffic passing through the security gateway 102. By analyzing packets flowing through the security gateway 102 and determining whether those packets should be allowed to continue traveling through the network, the security gateway 102 can prevent malicious traffic from reaching a protected server, modify the malicious traffic, and/or create an alert to trigger another responsive event or notify a user of the detection of the malicious traffic.

In an embodiment of the invention, the security gateway 102 is communicatively coupled between the client end stations 120A-120N and the server end stations 110, such that all traffic destined to the server end stations 110 is first passed through (or made available to) the security gateway 102 for analysis. In some embodiments, the security gateway 102 executes as part of a separate server end station or a (dedicated or shared) network device; but in other embodiments, the security gateway 102 operates as part of server end stations 110 (for example, as a software module), or is implemented using or another type of electronic device and can be software, hardware, or a combination of both.

Security gateways 102 are sometimes deployed as transparent inline bridges or routers. Transparent inline bridges and routers are placed between clients and servers, but are "transparent" to both the clients and servers. Thus, packets sent by a client to a server will arrive at the security gateway 102, be analyzed by the security gateway 102, and be blocked or forwarded on to the server when the packets are deemed acceptable by the security gateway. Accordingly, in transparent security gateway deployments, a client forms a communication connection directly with the server. Thus, in the case of secure websites using an encryption layer connection, a client forms the encryption layer connection directly with the server. Security gateways 102 may also be deployed as a non-inline sniffer (see FIG. 13 non-inline sniffer 1320B) or reverse proxy or transparent proxy (see FIG. 13 reverse proxy or transparent proxy 1320C), any of which may be coupled to a switch (e.g., 1345) or other network device forwarding network traffic between the client end stations 120A-120N and the server end stations 110. Further detail regarding some possible deployment configurations of security gateways 102 is presented herein with respect to FIG. 13.

Client end stations 120A-120N (e.g., workstations, laptops, netbooks, palm tops, mobile phones, smartphones, multimedia phones, Voice Over Internet Protocol (VoIP) phones, user equipment (UE), terminals, portable media players, GPS units, gaming systems, set-top boxes) are computing devices operable to execute applications 126 that, among other functions, can access the content (e.g., enterprise data) and/or services provided by the server end stations 110. In some embodiments, the client end stations 120A-120N execute applications 126 to allow a user to create, delete, view, and/or edit user data files 129 stored locally (i.e., within that client end station). The client end stations 120A-120N may utilize configuration repositories 128 during a configuration portion of execution, which include application configuration data 131 providing properties that configure the settings and operation of the applications 126. Example configuration repositories include, but are not limited to, "INI" files (i.e., application initialization files), operating system configurations such as the Windows® Registry, application-specific "config" files (e.g., ".cfg", ".config", "config.txt"), data source names (DSNs), framework configuration files, browser local storage (e.g., a browser database, cookies, etc.), resource-definition files (i.e., "rc files"), etc.

The client end stations 120A-120N and the server end stations 110 frequently—but not at all points in time—operate within a same LAN controlled and/or operated by an enterprise. An enterprise is a business, organization, governmental body, or other collective body utilizing or providing the content and/or services of the server end stations 110. Some users of the client end stations 120A-120N are deemed enterprise users or authorized users (e.g. authorized user 122), which are those users explicitly or implicitly part of the enterprise. Authorized users 122, using the client end stations 120A-120N, typically access the content (e.g., enterprise data) and/or services of the server end stations 110 from within a same LAN as the server end stations 110, or when the client end stations 120A-120N are connected to the LAN through use of virtual private network (VPN) connections to the LAN overlaid on (e.g., tunneled through) the Internet. In some embodiments, though, one or more of the servers (e.g., 112, 114, 116) of the server end stations 110 may be configured to be directly accessible from outside the LAN.

As detailed above, intrusions into a LAN may seek access to the enterprise data provided by server end stations 110. Such intrusions may occur through a compromised client end station (e.g., 120A) assigned to one or more authorized users 122 that has been accessed or controlled by an intruder 124. In some instances, the intruder 124 may have direct, physical access to the client end station 120A, but in other instances, the intruder 124 may be able to connect to the client end station 120A from a separate client end station 125 existing either inside or outside the LAN. For example, the intruder 124 may be granted access to the client end station 120A when an authorized user 122 accesses a malicious webpage (via the client end station 120A) causing a malicious program or code (i.e., "malware") to be executed by the client end station 120A. For example, the authorized user 122, using a web browser of the client end station 120A, may load a web page hosting an "exploit kit" that subjects the client end station 120A to one or more attacks (attempting to install malware) against the web browser or other software that the web browser can invoke, such as a third party document viewer or multimedia player, or may attempt to lure the authorized user 122 into surreptitiously allowing or causing the malware to be installed to the client end station 120A. With access to the compromised client end station 120A, the intruder 124 may then attempt to access enterprise data of the enterprise (from, for example, the database server 112, file server 114, and/or web application server 116) using information and/or credentials granted to the client end station 120A or authorized user 122 that is stored on the client end station 120A.

Through use of reverse honey tokens, according to embodiments of the invention, the nature of the client end station 120A as having been compromised may be detected so that the enterprise data of the server end stations 110 may be protected. The embodiment of the invention illustrated in FIG. 1 enables such protection using the security gateway 102 along with one or more of the following modules: a reverse honey token (RHT) distribution module 106, an RHT maintenance module 107, an RHT central module 105, and a security management module 108. Modules 105-108, in various embodiments, may be implemented with software, hardware, or a combination of both. In one embodiment of the invention, the RHT maintenance module 107, RHT central module 105, and security gateway management module 108 are part of a management server (depicted in FIG. 13 as management server 1360), and the RHT distribution module 106 is part of a separate network management server (depicted in FIG. 13 as network management server 1320). However, these modules 105-108 may be implemented in a variety of configurations, including implementing each module 105-108 using a separate electronic device, all of the modules 105-108 on just one electronic device, or implementing some (but not all) of the modules 105-108 on an electronic device.

In an embodiment of the invention, the RHT central module 105 is configured to generate one or more reverse honey tokens 130A-130N through a RHT generation module 109, which will ultimately be placed within application configuration data 131 of one or more configuration repositories 128 of one or more client end stations 120A-120N. In embodiments of the invention the reverse honey tokens 130A-130N are placed in application configuration data 131 of configuration repositories 128 typically used by applications 126, which reduces the likelihood of inadvertent access by an authorized user 122 as compared to placing the reverse honey tokens 130A-130N within user data files 129 that are commonly accessed by authorized users, while still allowing for intruders (e.g., 124) to discover their existence. In some embodiments, though, the RHT central module 105 may retrieve or be provided, via another computing device or a client, a set of reverse honey tokens 130A-130N to be used. The reverse honey tokens 130A-130N may be any of a number of different types of information and, in most embodiments, are not legitimate/valid and thus cannot actually be used to access any enterprise data from server end stations 110, which removes the possibility of sensitive enterprise data from being accessed if the reverse honey tokens 130A-130N somehow are not detected. In various embodiments, the reverse honey tokens 130A-130N utilized may be of any number of types including, but not limited to, one or more of a username, a password, a network address (such as an IP address of a server), a filename or file identifier, a directory name, a file system path, a URL or URI, a port number, a machine/host name, a database name, a table name, a database column name, a database query, a database connection string, details describing a protocol, an encryption key, a hash function name or algorithm, data representing an answer for a "secret" question, a program name, a telephone number, an operating system name or identifier, a name or identifier of a software program, a cookie value of an HTTP cookie, or any other type of information that seemingly could be used to access data from an electronic device or server.

In an embodiment of the invention, the RHT generation module 109 generates a reverse honey token (e.g., 130A) by first determining the type of honey token to be generated. In some embodiments, the types of reverse honey tokens to be generated are selected based upon configuration, though in other embodiments the types of reverse honey tokens are selected randomly, and in some embodiments the selected types are based upon specific characteristics of the client end station(s) 120A-120N that the tokens are to be placed on. For example, if a reverse honey token is to be generated for a laptop client end station 120A running a Windows® operating system, a reverse honey token 130A type may be selected according to what particular configuration repositories 128 exist for the Windows® operating system, and what particular types of application configuration data 131 exist within those configuration repositories 128. Some examples of reverse honey token types to be used for particular configuration repositories are presented later herein with respect to FIG. 4.

To generate a reverse honey token for a known type, a set of characteristics for that type are determined. For example, a set of characteristics for a "database username" type may dictate that the honey token must be longer than 4 characters in length, shorter than 16 characters in length, and contain only American Standard Code for Information Interchange (ASCII) characters. As another example, a set of characteristics for a file name may dictate that the generated reverse honey token must include only upper- and lower-case letters, numbers, underscores and periods, and additionally must be less than 255 ASCII characters in length. The set of characteristics for each type of reverse honey token may be determined by one of skill in the art, since these values typically have rigid format requirements per formal standard requirements or well-known best practices. Thus, in some embodiments of the invention, a random or pseudo-random reverse honey token is generated that meets the set of characteristics. However, for some types of reverse honey tokens, a random or pseudo-random value would not be believable (in the eyes of an intruder 124) as a legitimate value, and instead the RHT generation module 109 may be configured to utilize another set of rules proscribing requirements for creating "believable" values. For example, a reverse honey token of type "password" may have an additional set of rules requiring that, in addition to meeting the set of characteristics for the type, that a word from an English dictionary or a list of common proper nouns must be included in the generated reverse honey token, as it is known that many passwords in use today tend to include such values.

In some embodiments, the RHT generation module 109 also utilizes an RHT candidate filtering module 103 to further determine whether a reverse honey token should be used. The RHT candidate filtering module 103 includes logic and/or data useful to determine if the use of a particular reverse honey token would conflict with an actual value used in the LAN, enterprise, or the server end stations 110. For example, in an embodiment, the RHT candidate filtering module 103 includes a list of valid values for each type of reverse honey token that are actually being utilized by the server end stations 110. For example, the RHT candidate filtering module 103 may maintain a list of names of actual database tables 111A-111M by database server 112, and then remove any generated reverse honey token from consideration that matches an actual database table name in the list. In some embodiments, the RHT candidate filtering module 103 is configured to, in real-time or periodically in a batch operation, send requests to one or more computing devices (e.g., server end stations 110) and/or servers (112, 114, 116) to acquire the list of valid values for the one or more utilized reverse honey token types.

In the embodiment depicted in FIG. 1, a generated reverse honey token is provided to the RHT distribution module 106, which operates to, at circle '1A', place the reverse honey token on one or more of the client end stations 120A-120N. In an embodiment, the RHT distribution module 106 includes a server module to generate and distribute Windows® Active Directory Group Policy Objects (GPO) including the reverse honey tokens, which are pushed out to the client end stations 120A-120N (e.g., during a login or logout, or at some other point). For example, a GPO may comprise a script that, when pushed to and executed by a client end station 120A, places a reverse honey token 130A within an existing configuration repository 128 on the client end station 120A or generates a completely new configuration repository 128 including the reverse honey token 130A. In other embodiments, other distribution modules may include a Microsoft® System Center Configuration Manager (SCCM) component, an IBM® Tivoli® component, or another enterprise end station management software package.

In other embodiments, the RHT distribution module 106 is configured to simply transmit portions of or complete configuration repositories 128 to the client end stations 120A-120N (e.g., using a Secure Copy (SCP) program, Telnet, FTP, WinSCP, etc.), and in some embodiments each client end station 120A-120N is configured to proactively connect to the RHT distribution module 106 to retrieve reverse honey tokens 130A-130N, application configuration data 131, and/or configuration repositories 128.

In some scenarios, embodiments of the invention will create configuration repositories 128 of a format that are generally used by some types of applications, but not used by any applications 126 of that client end station 120A. Similarly, embodiments of the invention may place reverse honey tokens 130A-130N within a valid configuration repository 128 that is actively used by one or more applications 126 of the client end station 120A, but in a portion within the configuration repository 128 or in a format that will not actually be used by those applications 126. In these embodiments, the placement of the reverse honey tokens 130A-130N will not introduce any unintended side effects to the operation of the applications 126 (e.g., misconfigurations, errors, etc.).

The generated reverse honey token 130A is also provided, by the RHT central module 105 to the security management module 108, which is configured to, at circle '1B' send data and/or instructions to the security gateway 102 to cause it to install a set of one or more attribute values (e.g., portions of or all of the reverse honey token 130A, or some other logic for detecting the attempted use of the reverse honey token 130A such as a pattern identifier) to be utilized for one or more security rules that cause the RHT detection module 104 of the security gateway 102 to monitor network traffic for attempted use of the reverse honey token as evidenced by receipt of a set of one or more packets that include the reverse honey token, and then generate an alert 140. In some embodiments, the security management module 108 transmits the reverse honey token 130A (as the set of one or more attribute values) along with information indicating that the token 130A is to be placed within a list of reverse honey tokens that the security gateway 102 looks for when examining traffic destined to servers (112, 114, 116). In other embodiments, the security management module 108 transmits an instruction to generate a new security rule to be used by the RHT detection module 104 to seek the reverse honey token 130A in network traffic.

As an example, the RHT detection module 104 may be configured to monitor network traffic for an attempted use of the reverse honey token by, looking for a database login attempt using a database user name within a list of known (or derivable) reverse honey token database user names, looking for a database "USE" command (i.e., a command to select a particular database to be used) seeking to utilize a database name included within a list of known (or derivable) reverse honey token database names, looking for a database query utilizing a table name existing in a list of known (or derivable) reverse honey token database table names, looking for a database query (or a portion of a database query) that matches a query pattern in a list of known (or derivable) reverse honey token query patterns, looking for an attempted access (e.g., CIFS, NFS, Sharepoint access) to a file or directory/folder having a filename, directory name, or path in a list of known (or derivable) reverse honey token filenames, directory names, or paths, looking for HTTP messages containing web application authentication credentials including a username and/or password that are known to be (or can be determined to be) reverse honey tokens, and/or looking for HTTP messages seeking to access a particular URL or URI that is known (or can be determined to be) a reverse honey token network location. Of course, these examples represent only a few detection schemes for detecting the use of reverse honey tokens, and many other detection schemes are enabled through embodiments of the invention.

After a set of one or more reverse honey tokens 130A-130N have been installed on one or more of the client end stations 120A-120N and the RHT detection module 104 has been configured to utilize a set of attribute values for a security rule to detect the use of any of the set of reverse honey tokens in traffic, at circle '2', an intruder 124 accesses the client end station 120A. In some scenarios, as described earlier herein, the intruder may have physical access to the client end station 120A, or may access the client end station 120A using another client end station 125 (e.g., an end station owned or operated by the intruder 124, as opposed to a client end station 120A-120N owned or operated by the enterprise). In some scenarios, the intruder 124 is able to interact with the client end station 120A—perhaps by remotely sending commands to it and receiving output in response—but in other scenarios, the intruder 124 will simply receive some output from the client end station 120A, such as data that has been "harvested" by a piece of malware executing on the client end station 120A. In cases where the intruder 124 has physical access to the client end station 120A, he or she may simply utilize the input/output devices of the client end station 120A.

Although the intruder 124 may examine user data files 129 (e.g., word processing documents, images, videos, plaintext files, spreadsheets, user databases, etc.) in an attempt to discover sensitive or valuable data, many intruders 124 may also recognize that configuration repositories 128 often include a wealth of useful information about a network and the resources and devices within that network. Accordingly, at circle '3', the intruder 124 may search for configuration repositories that are known to include valuable information or appear likely to include valuable information, and access one or more of the configuration repositories 128 to discover seemingly valuable information (i.e., the reverse honey tokens 130A-130N). These reverse honey tokens 130A-130N (e.g., usernames, passwords, server names/addresses, etc.) appear to provide information useful in acquiring enterprise data from one or more of the servers (112, 114, 116) of the server end stations 110.

At circle '4', the intruder 124 attempts to utilize the information from the reverse honey tokens 130A-130N to acquire enterprise data from one or more of the servers (112, 114, 116) of the server end stations 110. For example, the intruder 124—through a "compromised" client end station 120A under complete or partial control of the intruder 124 or through a client end station 125 owned or operated by the intruder 124—may send a set of packets 132 including one or more of the reverse honey tokens (e.g., reverse honey token 130A). The reverse honey token 130A may be a part of a set of packet headers used to transport a payload, or may be carried by the payload itself. For example, a reverse honey token 130A, in an embodiment, could be an illegitimate IP address for a web application server 116, and thus the illegitimate IP address could appear in a destination IP address field of an IP header of the packets 132. As another example, a reverse honey token 130A could be a name of an invalid database table not existing within the set of tables 111A-111M of the database server 112; thus, the name of the invalid database table could exist within a database query (e.g., a SQL query) carried by a payload of the set of packets 132. The set of packets 132, in an embodiment of the invention, will transport packet payloads adhering to a protocol for interacting with one or more of the servers (112, 114, 116). For example, if the reverse honey token 130A comprises information that appears to provide information useful for accessing file server 114, the set of packets 132 will carry payloads following a protocol such as the Server Message Block (SMB) protocol or the Common Internet File System (CIFS) protocol. Similarly, the packets 132 may carry information adhering to other data access protocols, including but not limited to HTTP, Telnet, FTP, Simple Mail Transfer Protocol (SMTP), Internet Message Access Protocol (IMAP), Post Office Protocol (POP), Simple Network Management Protocol (SNMP), NFS, etc.

At circle '5', the security gateway 102 receives the set of packets 132 including the reverse honey token 130A, and a reverse honey token detection module 104 applies a set of security rules to the packets 132. Upon applying the security rule checking for the reverse honey token-related attribute values provided by the security management module 108, the packets 132 will trigger the security rule (i.e., satisfy a condition of the security rule) and generate an alert 140.

The generated alert 140 may comprise, depending upon configuration, one or more actions, including but not limited to blocking the set of packets 132 by not forwarding them on to the destination server (i.e., dropping the packets 132), which is easily implemented when the security gateway 102 is configured inline between the client end stations 120A-120N and the server end stations 110. The one or more actions of the generated alert 140 may comprise sending a notification message to an administrative user or other user describing the receipt of the reverse honey token (e.g., 130A), sending a notification message to one or more other security gateways 102, the security management module 108, and/or one or more of the servers (112, 114, 116), which may enable those recipients to implement further security protections against the intruder and/or user of the reverse honey token 130A. In some embodiments, the one or more actions of the generated alert 140 may comprise one or more of transmitting an error message back toward the intruder 124, and/or transmitting a fake server response to the intruder 124. For example, when the set of packets 132 include a reverse honey token 130A within (or comprising) a SQL query, the security gateway 102 may transmit, back toward the intruder 124, a trick SQL response (manufactured on the fly based upon the SQL query, or a predetermined response) to the intruder 124 including data appearing to comprise valid SQL result data from the SQL query, or data appearing to comprise a SQL error message responsive to the SQL query. In some embodiments, the one or more actions of the generated alert 140 may comprise implementing a security rule to place all traffic received from the source of the packets 132 (i.e., the intruder 124) under heightened scrutiny (e.g., closely monitor all traffic from an IP address of the intruder 124), and/or implementing a security rule to place all traffic of a particular database user under heightened scrutiny (when, for example, the reverse honey token 130A is a SQL query or database table name).

In some embodiments of the invention, the RHT central module 105 further includes a reverse honey token script generation module 121. The RHT script generation module 121 generates custom computing programs (e.g., RHT script 150A) to be used by the one or more client end stations 120A-120N and possibly the security gateway 102 (e.g., RHT script 151B). In one embodiment, the RHT script generation module 121 generates an RHT script 150A based upon the type of client end station 120A or client end stations 120A-120N that the RHT script 150A is to be sent to (e.g., what operating system type), what applications 126 are typically executed and/or stored by the client end stations 120A-120N, and/or what servers (112, 114, 116) and resources (e.g., tables 111A-111M, databases 113A-113N, files 115A-115L, web application 118) exist to be protected. In some embodiments, the RHT script generation module 121 provides one or more scripts to the RHT distribution module 106 (for distribution to the client end stations 120A-120N), and in some embodiments the RHT script generation module 121 also provides an RHT script 151B to the security management module 108 to be provided to the security gateway 102. In other non-illustrated embodiments, the client end stations 120A-120N and/or security gateway 102 are provided with (or configured to include) one or more URIs that provide access to the RHT scripts (150A, 151B, etc.), and the client end stations 120A-120N and/or security gateway 102 will instead retrieve the RHT scripts.

The RHT script 150A may include a reverse honey token generation component 152A and may include an installation component 154A. The RHT generation component 152A provides logic and instructions for generating one or more reverse honey tokens 130A-130N, which may be based upon the types of applications 126 utilized on each particular client end station and the number and types of configuration repositories 128 on each client end station. Upon generation of the one or more honey tokens 130A-130N, the installation component 154A places the honey tokens 130A-130N within the application configuration data 131 of one or more existing configuration repositories 128 (e.g., within the Windows registry) and/or creates new configuration repositories 128 (e.g., within a newly-created DSN).

In some embodiments, the RHT script 151B utilized by the security gateway 102 acts very similar to the RHT script 150A of the client end stations 120A-120N, where its RHT generation component 152B generates reverse honey tokens (corresponding to the reverse honey tokens 130A-130 used by the client end stations 120A-120N), and its installation component 154B installs attribute values and/or security rules to enable the RHT detection module 104 to detect the attempted use of those reverse honey tokens. For example, in an embodiment, both the RHT script 150A and the RHT script 151A utilize a logically similar RHT generation component (152A, 152B) along with a common "seed" value (e.g., a time of day, a hostname of an end station, etc.) to each independently generate a same reverse honey token. In other embodiments—such as when the attribute values used by the RHT detection module 104 comprise a pattern (e.g., a prefix or postfix value) to be searched for within a value of one or more packets—the RHT script 151B can be utilized to validate that the detected value is in fact a reverse honey token, and not a legitimate value that just appears similar to a reverse honey token. For example, upon detecting a suspected reverse honey token, the RHT script 151B could utilize the RHT generation component 152B to generate one or more candidate reverse honey tokens that could be in use, and then determine if the detected value is within the set of candidate reverse honey tokens—if so, the alert 140 is generated.

Additionally, some embodiments of the invention utilize a RHT maintenance module 107 including a time schedule 123. The RHT maintenance module 107, based upon an occurrence of a date/time/event (per the time schedule 123, which could be a value representing a defined interval of time, a set of particular dates and times, etc.), causes the RHT central module 105 to maintain the reverse honey token scheme. In some embodiments, this maintenance includes causing a redistribution of the same reverse honey tokens 130A-130N as before, which ensures the availability/existence of reverse honey tokens on the client end stations 120A-120N, as the earlier reverse honey tokens 130A-130N could have been moved, modified, or deleted by an authorized user 122. In some embodiments, maintenance includes causing a distribution of additional and/or replacement reverse honey tokens 130A'-130N' that are different than the earlier-placed reverse honey tokens 130A-130N.

In some embodiments, the RHT central module 105 maintains a record of the dates/times that each reverse honey token 130A was placed on a client end station 120A. Then, upon the security gateway 102 detecting the use of a reverse honey token 130A within a set of packets 132, the RHT central module 105 is notified (of the time of detection, the received RHT 130A, and other metadata such as the source IP address of the packet) and can determine, using the record of RHT placement, one or both of which client end station (e.g., 120A) was compromised, as well as what approximate time (or range of times) of the compromise (as the detected reverse honey token 130A only existed on that client end station 120A for a known period of time, during which the compromise must have occurred). This determined information—the identity of the client end station 120A, and the approximate time or range of times of compromise—may be stored by the RHT central module 105 and/or reported to one or more users via a display and/or electronic message (e.g., e-mail, Short Message Service (SMS) message, instant message, etc.), enhancing any forensic investigation into the details surrounding the compromise of that client end station 120A.

Figure 2:
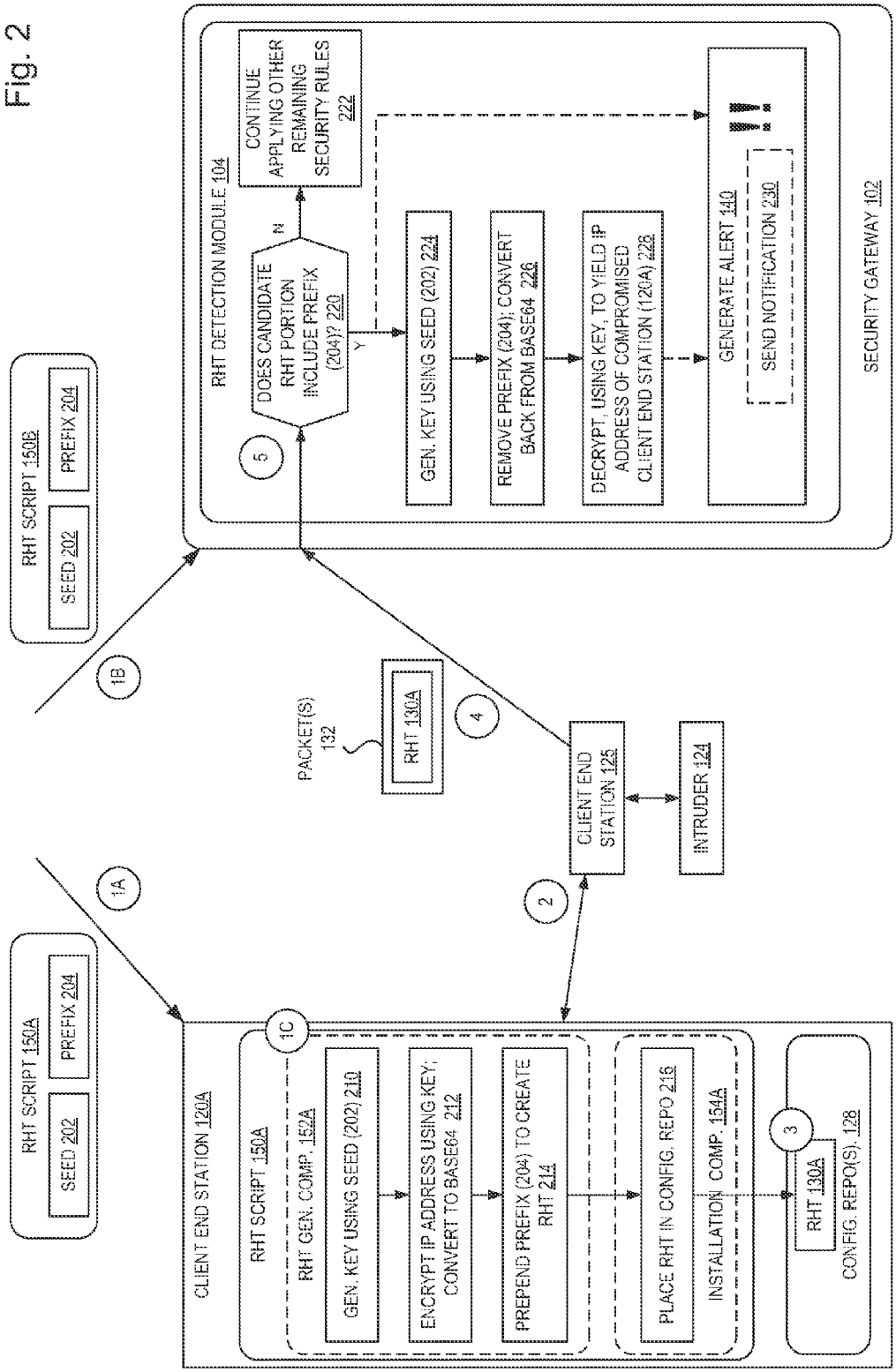
FIG. 2 is a combined block and flow diagram illustrating one embodiment of the invention for detecting that an intruder has compromised a client end station and detecting the identity of the client end station through the use of reverse honey token scripts utilizing a seed value and a prefix.

FIG. 2 is a combined block and flow diagram illustrating one embodiment of the invention for detecting that an intruder has compromised a client end station and detecting the identity of the client end station through the use of reverse honey token scripts utilizing a seed value 202 and an affix value (e.g., a prefix value 204 to be added to the beginning of another value, a postfix value to be added to the end of another value, etc.). In this depicted embodiment, RHT scripts 150A-150B are distributed to client end station 120A at circle '1A' (and optionally any other client end stations 120B-120N, not illustrated herein) and to the security gateway 102 at circle '1B' via the non-illustrated RHT distribution module 106 and security management module 108, respectively. The seed value 202 (also commonly referred to as a random seed, seed state, or seed) is a number or sequence of values (e.g., bits, integers, characters) that can be used to initialize pseudorandom number generators, which are used in cryptographic processes. The prefix value 204 is another value comprising a set of one or more values (e.g., bits, integers, characters) that can be prepended to (i.e., concatenated at the beginning of) a target value; in some non-illustrated embodiments, the affix value is a postfix value that is (also or alternatively) used, which similarly comprises a set of one or more values, but these values are appended after the target value.

At circle '1C', after receipt of the RHT script 150A, the client end station 120A executes the RHT script 150A, which logically performs the following flow: first, at block 210, the client end station 120A generates an encryption key using the seed value 202 according to well-known encryption algorithms in common use. Using the generated encryption key, at block 212 the client end station 120A encrypts the IP address assigned to that client end station 120A (or some other value that distinguishes that client end station 120A from the others), and converts the resulting binary value to a Base64 representation. At block 214, the prefix value 204 is prepended to the beginning of the Base64 representation of the encrypted IP address to create the reverse honey token 130A, which is placed in one or more configuration repositories 128 at block 216.

At circle '2' the intruder 124, via the client end station 125, connects to the client end station 120A and discovers, at circle '3', the existence of the reverse honey token 130A within the configuration repository 128.

At circle '4', the intruder 124, again via the client end station 125, transmits a set of one or more packets 132 including a request designed to access enterprise data of one of the servers (112, 114, 116) of the server end stations 110. This request carried by the set of packets 132 includes the reverse honey token 130A.

At circle '5', the set of packets 132 are received by the security gateway 102. With these packets 132, the RHT detection module 104 performs the following logical flow: at block 220, the RHT detection module 104 detects whether any candidate value (a value within the set of packets 132 at one or more particular locations ("candidate RHT portions") where reverse honey tokens might exist per configuration of the security rules applied by the security gateway 102) matches the prefix value 204.

If no candidate value matches the prefix value 204, the flow continues by switching to continue applying 222 any other remaining security rules 1350 to the set of packets 132.

If a candidate value does match the prefix value 204, the flow continues with block 224 and the RHT detection module may also optionally immediately generate an alert 140, which in some embodiments includes transmitting 230 a notification message to another enterprise user such as an administrator. At block 224, the RHT detection module 104 generates a key using the seed value. (In some embodiments, this block 224 instead occurs upon receipt of the RHT script 151B, and not responsive to determining that a candidate value of a set of packets 132 matches the prefix value 204. In those embodiments, block 220 moves straight to block 226).

At block 226, the RHT detection module 104 removes the matched prefix value 204 from the candidate value and converts it back from the Base64 representation to binary. At block 228, this binary value is decrypted, using the generated key from block 224, to yield the IP address (or whatever client end station distinguishing value was used) of the compromised client end station 120A. In some embodiments, upon reconstructing the IP address of the client end station 120A, the RHT detection module 104 generates an alert 140, which may comprise transmitting 230 a notification to a user or transmitting a notification or command to another device (e.g., client end station 120A, other client end stations 120B-120N, one or more server end stations 110, a network management server end station 1320 implementing the RHT distribution module 106, and/or a management server end station 1360 implementing the RHT maintenance module 107, RHT central module 105, and/or security management module 108.

As described above, in embodiments of the invention the reverse honey tokens 130A-130N are placed in application configuration data 131 of configuration repositories 128 typically used by applications 126, which reduces the likelihood of inadvertent access by an authorized user 122 as compared to placing the reverse honey tokens 130A-130N within user data files 129 that are commonly accessed by authorized users, while still allowing for intruders (e.g., 124) to discover their existence. Examples of such placement are depicted in FIG. 3, which is a block diagram illustrating exemplary applications 126, user data files 129, and configuration repositories 128 including reverse honey tokens stored on a client end station according to certain embodiments of the invention 300.

Figure 3:
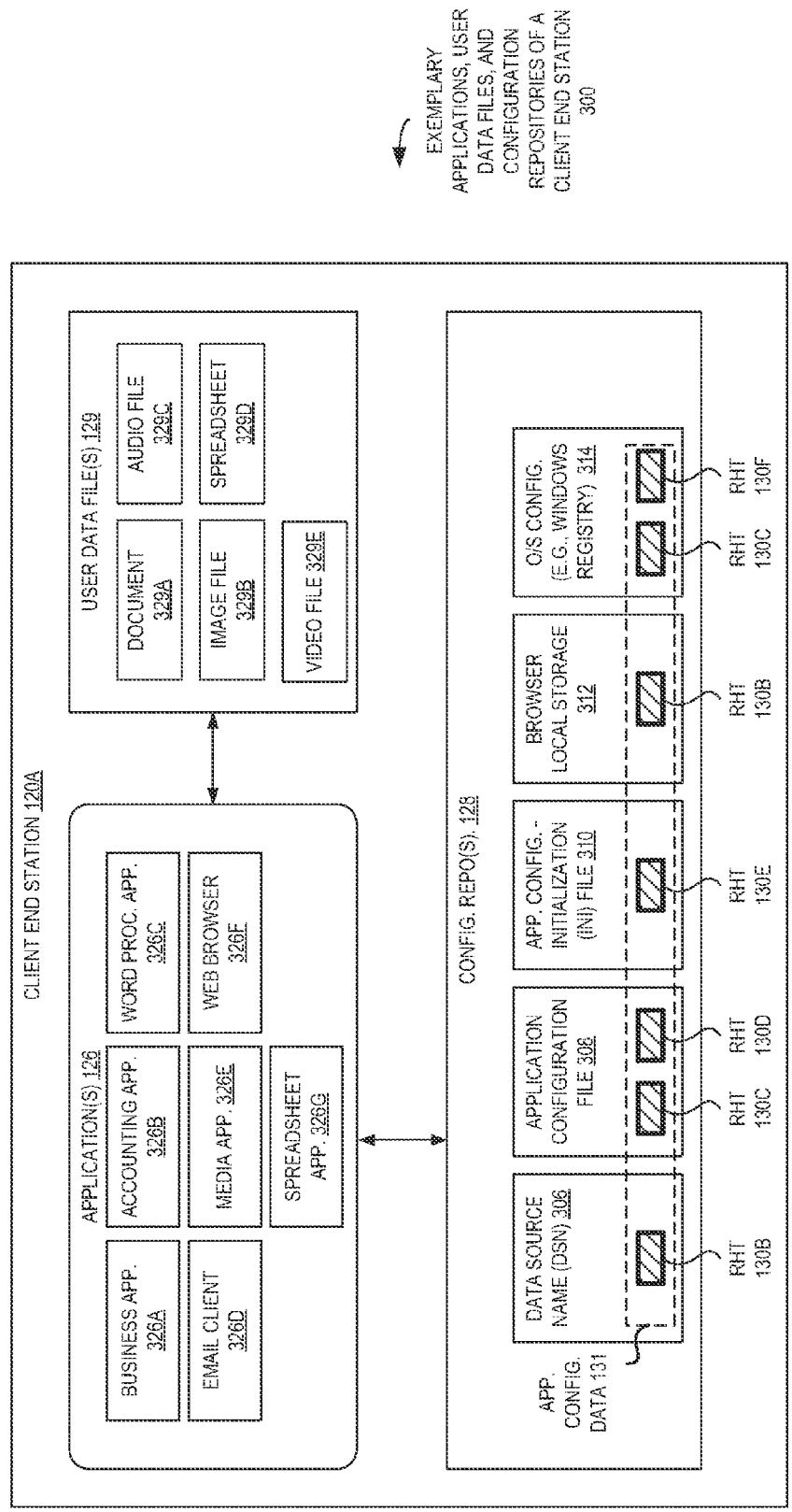
FIG. 3 is a block diagram illustrating exemplary applications, user data files, and configuration repositories including reverse honey tokens of a client end station according to certain embodiments of the invention.

An exemplary client end station 120A is depicted in FIG. 3, and includes multiple applications 126 commonly utilized by authorized users (e.g., 122) of an enterprise: a business application 326A (including but not limited to groupware software, customer relationship management (CRM) software, project management software), an accounting application 326B providing business accounting functionalities (e.g., QuickBooks™ by Intuit™), a word processing application 326C providing the ability to view, edit, and compose documents (e.g., Microsoft Word™, Apache OpenOffice Writer™, LibreOffice Writer™, WordPerfect™), an email client 326D providing for the receipt, composition, and transmission of electronic mail (e.g., Microsoft Outlook™, Mozilla Thunderbird™, Mail by Apple™), a media application 326E providing functionality to view and/or edit multimedia including videos and images (e.g., Microsoft Windows Media Player™, Apple's™ QuickTime Player™ and iTunes™, VLC Media Player™, Adobe's Photoshop™), a web browser 326F providing functionality to view web pages and utilize web applications (e.g., Google Chrome™, Mozilla Firefox™, Microsoft Internet Explorer™, Apple's Safari™, Opera™ browser), and a spreadsheet application 326G providing functionality to organize and analyze data in a tabular form (e.g., Microsoft Excel™, Apache OpenOffice Calc™, LibreOffice Calc™). While only a few types of common applications 126 are presented here, many other types of applications 126 exist.

In an embodiment, authorized users (e.g., 122) utilize these applications 126 to view, edit, create, and otherwise interact with user data files 129. User data files 129 are files typically used by human users of the client end station 120A, as opposed to files including object code or source code for applications and/or an operating system of the client end station 120A or configuration repositories 128 storing application configuration data used by the applications to configure the operation of those applications. A few examples of user data files 129 include image files 329B, video files 329E, documents 329A (e.g., text files, word processing document files, Portable Document Format (PDF) files, etc.), audio files 329C, and spreadsheet files 329D.

In contrast to user data files 129, the client end station 120A also includes a set of configuration repositories 128, which include application configuration data 131 utilized by the applications 126 to configure the operational settings and execution of the applications 126. A few examples of configuration repositories include, but are not limited to, data source name (DSN) 306 configurations, application configurations 308, application configuration initialization (INI) files 310, browser local storage 312, and operating system configuration files 314. The application configuration data 131 may be in a variety of forms, but in many examples includes one or more sets of attribute names and associated attribute values for those attribute names. For example, an attribute name might be "username" and an attribute value for that attribute name might be "john_smith". Similarly, an attribute name might be "supported_extensions" which might have several associated attribute values—"txt" and "doc" and "rtf", for example.

A naïve approach for placing reverse honey tokens might include placing them within legitimate or fake user data files (e.g., 129) on a client end station 120A, such as within an email message or word processing document (e.g., 329A). However, this technique suffers from a serious defect in that regular, authorized users are highly likely to discover and access the reverse honey tokens and/or user data files 129, and may delete them, modify the placed reverse honey tokens within them to make them legitimate (i.e., "fix" the purposefully incorrect values to represent the actual values), or even attempt to use the illegitimate values, which will result in confusion on the part of the end user and many false positives on the part of the security system. Instead, in embodiments of the invention, the reverse honey tokens are placed within configuration repositories 128.

In the example depicted in FIG. 3, each of the configuration repositories 128 includes one or more reverse honey tokens (130B-130F), and some of the reverse honey tokens (e.g., 130B, 130C) appear in more than one of the configuration repositories 128, though in some embodiments each reverse honey token (130B-130F) placed on the client end station 120A (or placed within a set of client end stations 120A-120N) is different.

DSNs 306 are data structures used to describe and define how to connect to a particular data source—typically a database server (e.g., 112). DSNs 306 typically include one or more of a name of the data source, a directory or location for the data source, a name of driver software that can access the data source, and a username and password allowing for data access. DSNs 306 are sometimes stored within the Windows Registry (e.g., 314) on client end stations 120A executing a Windows operating system, and may be stored in a variety of locations for client end stations 120A executing other operating systems (e.g., in Unix or Linux-type operating systems, DSNs may be stored at "/etc/odbc.ini", "~/.odbc.ini", "/etc/odbc_file_dsns/<filename>", "~/odbc_file_dsns/<filename>", etc.). Examples of editing, creating, and viewing aspects of DSNs 306 utilizing reverse honey tokens are further illustrated herein in FIG. 5 and FIG. 6.

Application configurations 308, which are also known as "configuration files" or "config files" or "rc files" or "dot files", are utilized by applications 126, operating systems and other system processes to configure initial settings for those computer programs. Application configurations 308 are typically line-oriented text-based files (e.g., ASCII files) often including an attribute name and one or more attribute values on each line (i.e., "key-value" pairs); however some application configurations 308 are binary files. Application configurations 308 are sometimes placed within a home directory of a user and may be somewhat hidden in some manner (e.g., placing a period or underscore at the beginning of the filename, as in a "dot file" used by Unix-type operating systems). Application configurations 308 are also sometimes placed within a file system directory or sub-directory "belonging" to each application, or may be placed in a centralized configuration location (e.g., "/etc" or "C:\WINDOWS\SYSTEM32\CONFIG\"). Application configurations 308 may also be "config.xml" files, which are eXtensible Markup Language (XML) files commonly used for a variety of uses including, but not limited to, configuring applications known as "packaged apps" or "widgets" that may be authored using a technology such as HTML and executed on a client end station (e.g., 120A), used to customize an installation procedure of an application, or used by an application designed for a mobile-type device. Examples of the use of reverse honey tokens in application configurations 308 are further illustrated herein in FIG. 7 and FIG. 8.

One type of application configuration 308 is an initialization (INI) file 310. INI files 310, typically, are simple text files having a basic structure composed of "keys" (or "properties") that may be grouped within one or more "sections". Each key is typically placed on its own line, and has a name and a value (or, attribute name and attribute value) that are typically separated by an equals sign. In most 16-bit Windows platforms (i.e., up through Windows ME™ and Windows 2000™), the INI file served as the primary mechanism to configure the operating system and application 126 features, such as the device drivers, fonts, startup launchers, and other settings that are needed to be initialized when first booting Windows. INI files 310 are also generally used by individual applications 126 to store their individual settings. An example of the use of reverse honey tokens in an application-specific INI file 310 is further illustrated herein in FIG. 9.

Another configuration repository 128 is browser local storage 312, which is typically a database, set of files, or other data structure utilized by a web browser 326F to store configuration data. Browser local storage 312, in some embodiments, is HTML5 client-side storage (also referred to as "web storage") that stores information related to the user and/or web applications, and may be "local" (persistent) or "session" (expires with the end of a browser session). Browser local storage 312 may also store HTTP cookies (small amounts of data sent from a website and stored in a user's web browser 326F while a user is browsing a website) or proprietary storage schemes (e.g., Flash local shared objects). One example of the use of reverse honey tokens in a browser local storage 312 configuration repository is illustrated herein in FIG. 10.

Another type of configuration repository 128 is an operating system (O/S) configuration 314, which may store application configuration data 131 for the O/S as well as one or more other applications 126. For example, many versions of Microsoft's Windows™ operating system utilize an O/S configuration 314 called the Windows Registry, which stores settings for low-level operating system components, and also for applications 126 that have opted to use the registry. The Windows registry includes two basic elements: keys and values. Registry keys are container objects that are analogous to folders, and registry values are non-container objects similar to files. The Registry keys may contain values or additional keys. Registry keys are referenced using syntax similar to Windows file system path nomenclature, using backslashes to indicate levels of hierarchy. The Windows registry may be stored in several files (e.g., in "C:\Windows\System32\Config"), and may be in a plaintext or binary file format. In Unix-like operating systems, operating system configuration 314 information is traditionally stored in one or more files at a file system location (e.g., "/etc/" or "/usr/local/etc/"), and in Apple Inc.'s Mac OS X™ the operating system configuration 314 is provided by property list files stored within each user's "Library" folder. Additionally, many mobile devices include operating system configurations 314 that are stored in a variety of different locations, depending upon the O/S. An example depicting the use of reverse honey tokens in an O/S configuration 314 (Windows Registry) is illustrated herein in FIG. 11.

In some embodiments of the invention, one or more of the applications 126, user data files 129, and configuration repositories 128 may not be stored on any persistent storage device (e.g., a flash memory, traditional disk-based storage device) of or attached to the client end station 120A—instead, some or all of those entities may be retrieved by the client end station 120A from another device using a set of one or more physical network interfaces. In these embodiments, the reverse honey tokens 130A-130N are still made available to the client end station 120A (e.g., stored in RAM on the client end station 120A, made easily available to the client end station 120A in some other way, etc.) so that they may be discovered by an intruder 124.

Although file system locations for configuration repositories differ based upon the operating system, file system, and applications 126 of each client end station 120A, the following are a few illustrative file system locations for configuration repositories 128 for a Windows™—type operating system, assuming a user with a username of "jane_doe":

```
C:\users\jane_doe\
C:\users\jane_doe\Application Data\
C:\Program Files\
C:\Windows\System32\Config\
C:\Users\jane_doe\Appdata\Local\Microsoft\Windows\
```

Similarly, the following are a few illustrative file system locations for configuration repositories 128 for a Unix-type operating system, assuming a user with a username of "jane_doe":

```
/etc/
/home/jane_doe/
/home/jane_doe/.config/
/home/jane_doe /.local/
```

FIG. 4 is a diagram illustrating some exemplary reverse honey tokens that can be placed within some exemplary configuration repositories according to certain embodiments of the invention. However, it is expressly contemplated that other reverse honey token types 400 and other configuration repository types 401 may be utilized in other embodiments of the invention. Further, the use of certain of the reverse honey token types 400 with certain of the configuration repository types 401, as depicted in FIG. 4, does not imply that these are the only reverse honey token types 400 that can be used by these certain configuration repository types 401—this figure simply presents one possible combination thereof utilized in one embodiment of the invention.

In the table of FIG. 4, a DSN 306 configuration repository may include a database username 402, a database password 404, and a database name 406. An application configuration 308 may also include a database username 402, a database password 404, and a database name 406. Of course, for a given embodiment zero, one, or both of these configuration repository types 401 may be utilized for a particular client end station. In an embodiment where these three reverse honey token types 400 (and/or values) are included on a particular client end station, they could be the same or different.

An application configuration initialization file 310 may include a database username 402, a database password 404, a database name 406, a database table name 408, a database query 410, a network folder path 412, and/or a network file path 414. A browser local storage 312 may include an application username 416 (e.g., a username for a particular web application) and an application password 418 (the password for that username for that particular web application). An operating system configuration 314 may include a database username 402, a database password 404, a database name 406, a database table name 408, a database query 410, a network folder path 412, and/or a network file path 414.

Figure 5:
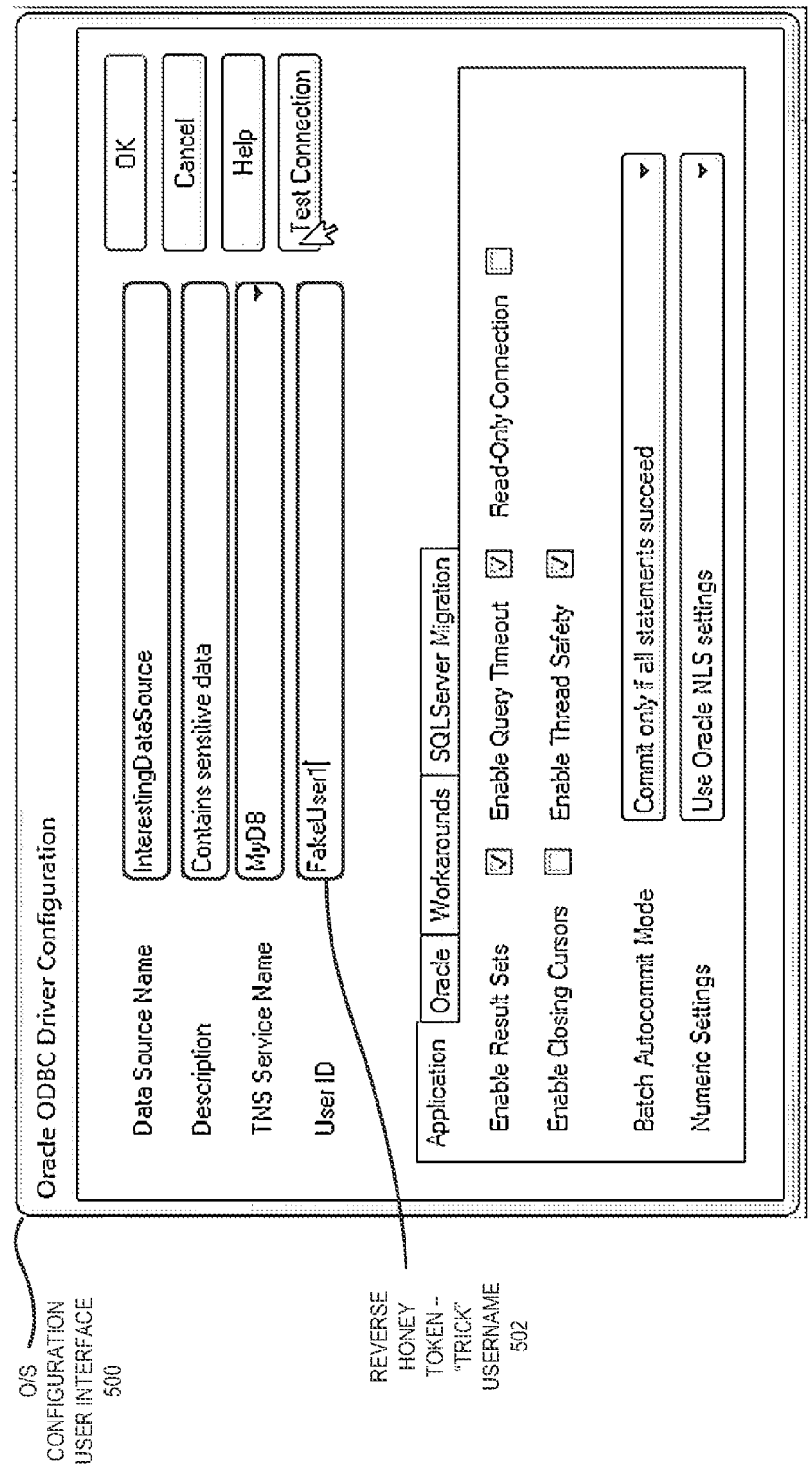
FIG. 5 is a diagram illustrating a user interface useful in establishing or viewing a data source name configuration repository and including a reverse honey token according to certain embodiments of the invention.

FIG. 5 is a diagram illustrating a user interface 500 useful in establishing or viewing a data source name configuration repository and including a reverse honey token 502 according to certain embodiments of the invention. This diagram presents a graphical user interface 500 commonly used in a Windows™ operating system to allow users to configure or view the details of a DSN for an Open Database Connectivity (ODBC) connection to a data source. In the depicted example, a trick username reverse honey token 502 of "FakeUser1" exists within a user interface input box. In many embodiments of the invention, the trick username 502 is created to more strongly appear to be legitimate—the use of "FakeUser1" is simply used herein for ease of comprehension. The reverse honey token 502 is deemed a trick username 502 because while it will appear to be legitimate to nearly anyone, it is not actually a valid username for accessing the data using the DSN, and further, the server providing the underlying data services is not aware of the username whatsoever.

Figure 6:
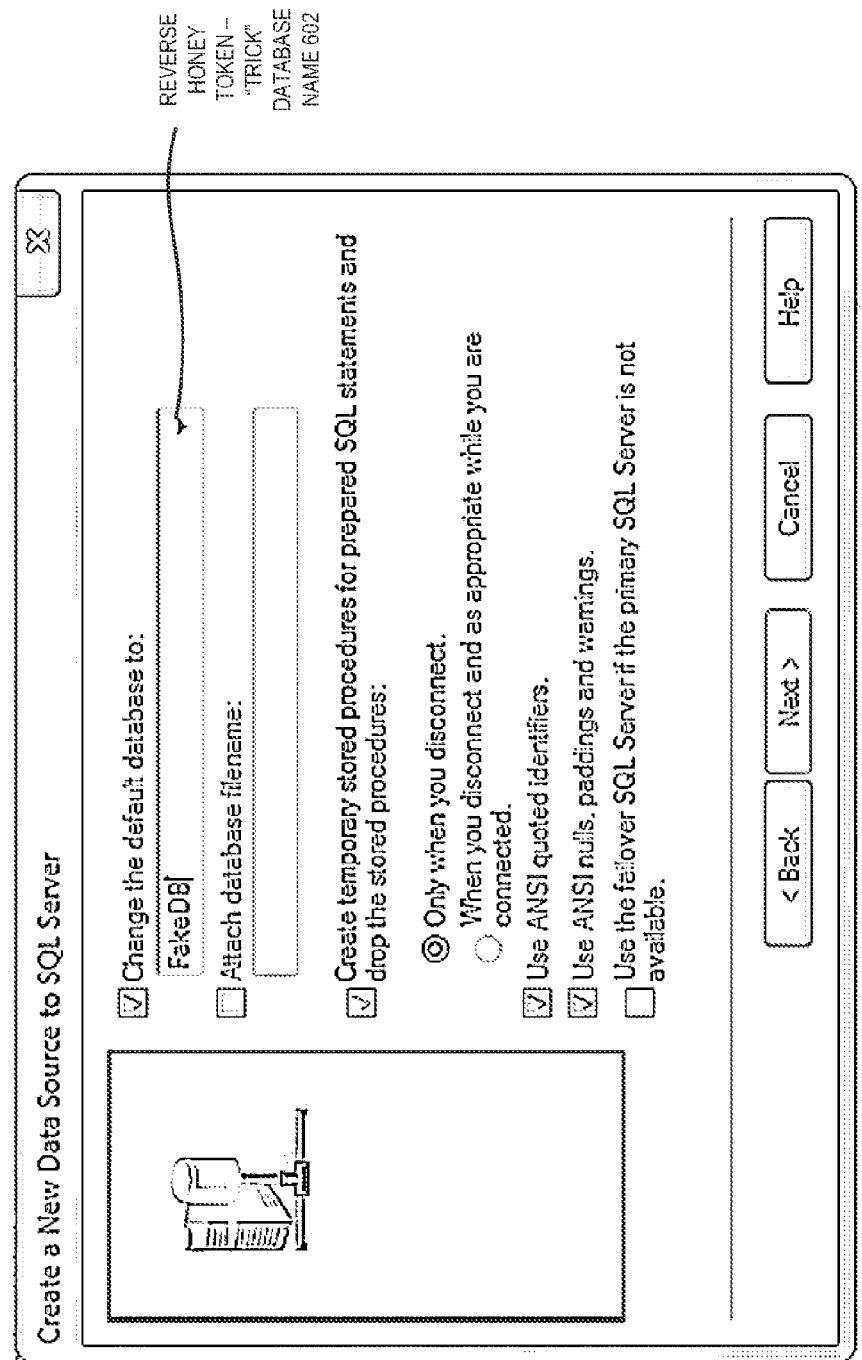
FIG. 6 is a diagram illustrating another user interface useful in establishing or viewing a data source name configuration repository and including a reverse honey token according to certain embodiments of the invention.

FIG. 6 is a diagram illustrating another user interface 600 useful in establishing or viewing a data source name configuration repository and including a reverse honey token 602 according to certain embodiments of the invention. This diagram presents another graphical user interface 500 commonly used in a Windows™ operating system to allow users to configure or view the details of a DSN for a connection to a SQL database. In the depicted example, a trick database name reverse honey token 602 of "FakeDB" exists within a user interface input box. Similar to the trick username reverse honey token 502 of FIG. 5, the trick database name reverse honey token 602 may be created in many embodiments to appear more legitimate, and the use of the trick database name of "FakeDB" is merely illustrative.

Figure 7:
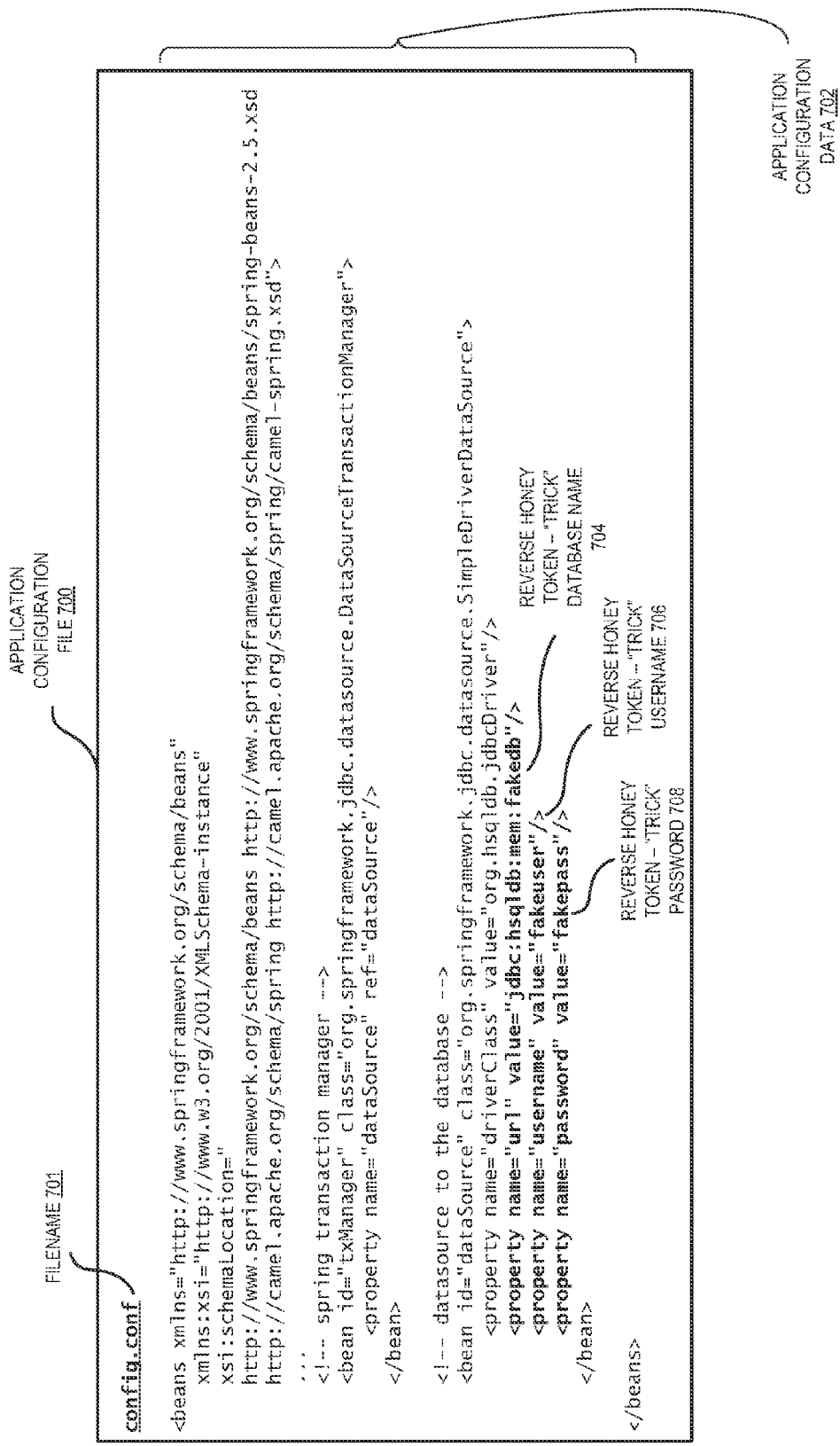
FIG. 7 is a diagram illustrating reverse honey tokens placed in an application configuration file according to certain embodiments of the invention.

FIG. 7 is a diagram illustrating reverse honey tokens placed in an application configuration file 700 according to certain embodiments of the invention. In an embodiment, the application configuration file 700 is named "config.conf" (i.e., has a filename 701) that might be used by an application utilizing the Spring Framework™ for the Java™ Platform. This application configuration file 700 includes application configuration data 702, which might be wholly or in part illegitimate. In this depicted embodiment, the application configuration file 700 includes three reverse honey tokens—a trick database name 704 of "fakedb", a trick username 706 of "fakeuser", and a trick password 708 for that username of "fakepass".

FIG. 8 is another diagram illustrating reverse honey tokens placed in different application configuration files according to certain embodiments of the invention. In FIG. 8, a first application configuration file portion 800 and a second application configuration file portion 802 are illustrated including portions of an application configuration file for an application utilizing the Castor™ Object-Relational Binding Framework, which is a framework for moving data from XML to Java programming language objects and from Java to databases. The first application configuration file portion 800 includes application configuration data seemingly configuring a connection to an Oracle 8™ database. This portion 800 includes a trick username 804 of "trickuser" and a trick password 806 of "trickpass". The second application configuration file portion 802 includes application configuration data seemingly configuring a connection to a PostgreSQL 7.1 database, and includes five different reverse honey tokens: a trick hostname 808 of "trickhost", a trick port 810 of "trickport", a trick database name 812 of "trickdb", a trick username 814 of "trickuser", and a trick password 816 of "trickpass". As described herein, these trick values are invalid, and thus a database with a hostname "trickhost" does not exist, and similarly is not available at port "trickport", does not host a database named "trickdb", or allow connections from a user "trickuser" with a password "trickpass".

FIG. 9 is a diagram illustrating reverse honey tokens placed in an application-specific initialization configuration repository according to certain embodiments of the invention. In FIG. 9, an application initialization (INI) file 900 with a filename 901 of "app_xyz.ini" is depicted as including several reverse honey tokens. In this depicted example, the INI file 900 includes a DSN including a trick username 902, a trick password 904, a trick hostname 906, and a trick database name 908. Further, the INI file 900 includes a trick server name 910, a trick directory name/path 912, a trick file name/path 914, and a trick database query 916 that itself may include invalid query sections including but not limited to an invalid database name, an invalid database table name, an invalid database field name, an invalid database value, or one or more other invalid query sections.

FIG. 10 is a diagram illustrating reverse honey tokens placed in a browser local storage 1000 database configuration repository according to certain embodiments of the invention. In this figure, the browser local storage 1000 comprises one record of a sqlite database table named "moz_logins" used by a version of the FireFox™ web browser to store encrypted passwords for various web applications. In an embodiment, one or more reverse honey tokens (e.g., 1002, 1004, 1006) are placed within application configuration data (as an illegitimate record in a "moz_logins" table). In this embodiment, a trick network address 1002 (i.e., a URL) as well as a trick encrypted username 1004 and trick encrypted password 1006 are placed in the moz_logins table on a client end station, and any detected use of the trick network address 1002 (e.g., an HTTP GET request to that address) and/or the encrypted username and password or the unencrypted versions of the username and password will cause the security gateway 102 to trigger the alert, since the authorized user 122 cannot access this database record as the trick network address does not exist.

Figure 11:
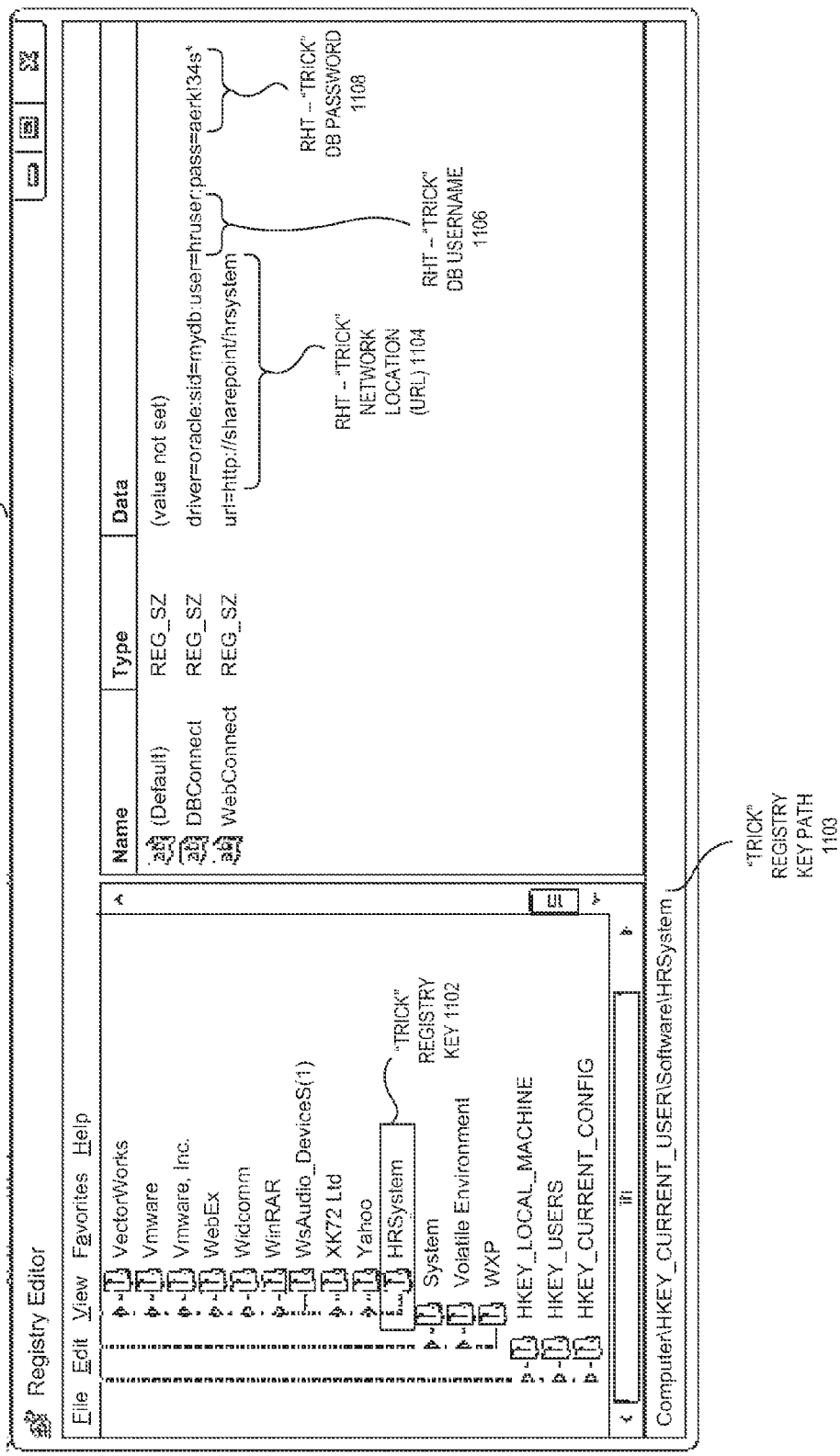
FIG. 11 is a diagram illustrating a user interface displaying reverse honey tokens in an operating system configuration repository according to certain embodiments of the invention.

FIG. 11 is a diagram illustrating a user interface 1100 displaying reverse honey tokens in an operating system configuration repository according to certain embodiments of the invention. In this example, the operating system configuration is a Windows registry, and the operating system configuration user interface 1100 is the Registry editor, a well-known application providing a graphical front-end to the Windows registry. In the depicted embodiment, a trick registry key 1102 by the name of "HRSystem" has been entered into the application configuration data of the registry, which has a trick registry key path 1103 of "Computer\HKEY_CURRENT_USER\Software\HRSystem". This trick registry key 1102 includes several reverse honey tokens, including a trick network location 1104 (here, a URL) apparently pointing (but not actually pointing) to a human resources data store system, and a trick database username 1106 of "hruser" and a trick database password 1108 of "aerk!34s" that both appear to be legitimate values.

Figure 12:
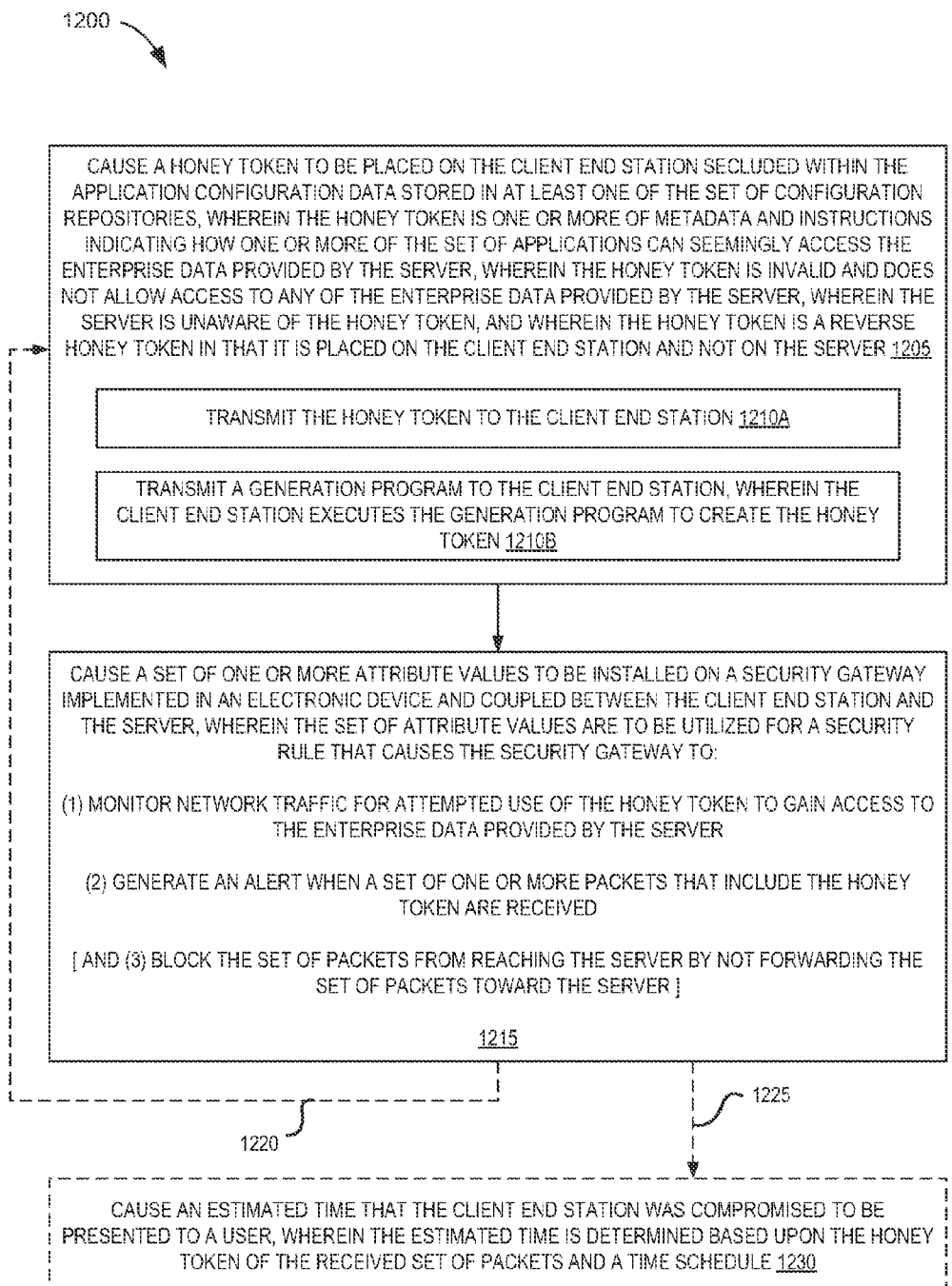
FIG. 12 is a diagram illustrating a flow for setting a trap to detect if an intruder has compromised a client end station to gain unauthorized access to enterprise data provided by a server executing on a server end station according to certain embodiments of the invention.

FIG. 12 is a diagram illustrating a flow 1200 for setting a trap to detect if an intruder has compromised a client end station to gain unauthorized access to enterprise data provided by a server executing on a server end station according to certain embodiments of the invention. At block 1205, the method includes causing a honey token to be placed on a client end station secluded within application configuration data stored in at least one of a set of configuration repositories. In the depicted example, the honey token includes one or more of metadata and instructions indicating how one or more of the set of applications can seemingly access the enterprise data provided by the server. In this embodiment, the honey token is invalid and does not allow access to any of the enterprise data provided by the server, and further the server is unaware of the honey token. Such a honey token constitutes a "reverse" honey token in that it is placed on the client end station and not on the server.

In one embodiment, this block 1205 includes transmitting 1210A the honey token to the client end station. In an embodiment, the block 1205 includes transmitting 1210B a generation program to the client end station, wherein the client end station executes the generation program to create the honey token.

At block 1215, the flow 1200 further includes causing a set of one or more attribute values to be installed on a security gateway. The security gateway is implemented in an electronic device and coupled between the client end station and the server. In this embodiment, the set of attribute values are to be utilized for a security rule that causes the security gateway to perform actions. The actions may include (1) monitoring network traffic for attempted use of the honey token to gain access to the enterprise data provided by the server, and (2) generating an alert when a set of one or more packets that include the honey token are received. In some embodiments, the actions also include blocking the set of packets from reaching the server, by not forwarding the set of packets toward the server.

Although block 1205 ("cause a honey token to be placed . . . ") is illustrated as occurring before block 1215 ("cause a set of one or more attribute values to be installed . . . ") in FIG. 12, in other embodiments, block 1215 is performed before block 1205, which causes the security gateway to be configured to detect a use of the reverse honey tokens before those reverse honey tokens are actually placed on any client end station. In these embodiments, the occurrence of block 1215 before block 1205 eliminates a possibility of a reverse honey token being placed on a client end station, discovered by an attacker, and used before the security is made aware of the existence of that reverse honey token. In these embodiments, arrow 1225 will logically flow from block 1205 instead of block 1215, as is currently depicted in FIG. 12.

In some embodiments, arrow 1220 indicates that one or both of block 1205 and block 1215 are performed again. In some of these embodiments, one or both of these blocks (1205, 1215) are performed according to a time schedule. This may occur to ensure that the availability of the reverse honey tokens on the client end station(s) is not interrupted (due to, perhaps a user modifying, deleting, or moving the reverse honey token). In some embodiments performing one or both of blocks 1205 and 1215 according to a time schedule, each iteration 1220 causes different honey tokens to be placed upon the client end station(s), and previously-placed reverse honey tokens may optionally be removed at this time. In an embodiment, upon detecting the use of one of the reverse honey tokens at arrow 1225, the flow 1200 includes causing an estimated time that the client end station was compromised to be presented to a user. In such an embodiment, the estimated time is determined based upon the received honey token and the time schedule—for example, a saved record of each placed honey token and the time that it was placed (or deleted) may be consulted to determine one or both of what time or range of times the compromise must have occurred, and/or which client end station was compromised.

Exemplary Deployment Environment

FIG. 13 illustrates an exemplary deployment environment including a reverse honey token distribution module 106, a reverse honey token maintenance module 107, a reverse honey token central module 105, and security management module 108 according to certain embodiments of the invention.

Specifically, FIG. 13 illustrates one or more client end stations 120A-120N, which connect, through a security gateway 102, to one or more server end stations 110 within a data center 1320. The server end stations 110 execute a web application server 116 that in turn executes a web application 118, a file server 114, and a database server 112. In an embodiment, the security gateway 102 and the server end stations 110 operate within a LAN, and the one or more client end stations 120A-120N also operate within the LAN or connect to the LAN through a WAN (e.g., the Internet) using a VPN.

In this depicted embodiment, the RHT distribution module 106 is executed by a network management server end station 1320, which may also execute software to distribute Windows® Active Directory Group Policy Objects (GPO), and/or a Microsoft® System Center Configuration Manager (SCCM) component, and/or an IBM® Tivoli® component, and/or another enterprise end station management software package.

In this depicted embodiment, the reverse honey token maintenance module 107, reverse honey token central module 105, and security management module 108 are executed as part of a management server end station 1360, which also updates and configures the security gateway 102 by sending rule information 1349 that can update, add, or remove security rules 1350 utilized by the security gateway to, among other security-related tasks, detect the attempted use of reverse honey tokens. In some embodiments, the security gateway 102 does not receive the rule information 1349, but instead has read access to the management server end station 1360, thereby enabling it to fetch/pull the security rules 1350 and/or rule information 1349.

In an embodiment the security gateway 102 is implemented on the server end stations 110. However, in this figure, the security gateway 102 executes on a network device that is communicatively coupled between the client end stations 120A-120N and the data center 1320.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

FIG. 13 illustrates three different deployments in which the security gateway 102 is implemented as a separate network device from the server end stations 110. The three different deployments are as follows: 1) as an inline transparent layer 2 bridge or layer 3 router 1320A in front of a switch 1345; 2) as a non-inline sniffer 1320B which is connected to a switch 1345 that sits between the client end stations 120A-120N and the data center 1320; and 3) as a reverse proxy or transparent proxy 1320C which is connected to a switch 1345 that sits between the client end stations 120A-120N and the data center 1320.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for setting a trap to detect if an intruder has compromised a client end station in an attempt to gain unauthorized access to enterprise data provided by a server executing on a server end station, wherein the client end station comprises a set of one or more user data files storing user data accessed through a set of one or more applications and further comprises a configuration repository storing application configuration data used by the set of one or more applications to configure the operation of the set of one or more applications, the method comprising:

causing a honey token to be placed on the client end station secluded within the application configuration data stored in the configuration repository, wherein the configuration repository is one of a data source name (DSN) data structure, a Windows registry database, an application configuration file, and a local storage of a web browser, wherein the honey token is one or more of metadata and instructions indicating how one or more of the set of one or more applications can seemingly access the enterprise data provided by the server, wherein the honey token is invalid and does not allow access to any of the enterprise data provided by the server, wherein the server is unaware of the honey token, wherein the honey token is a reverse honey token in that it is placed on the client end station and not on the server, wherein the causing the honey token includes transmitting a custom generation program to the client end station, and wherein the client end station executes the custom generation program to create the honey token; and causing a set of one or more attribute values to be installed on a security gateway implemented in an electronic device and coupled between the client end station and the server, wherein the set of one or more attribute values are to be utilized for a security rule that causes the security gateway to,
  monitor network traffic for attempted use of the honey token to gain access to the enterprise data provided by the server, and
  generate an alert when a set of one or more packets that include the honey token are received.

2. The method of claim 1, wherein the security rule further causes the security gateway to:
 block the set of one or more packets from reaching the server by not forwarding the set of one or more packets toward the server.

3. The method of claim 1, wherein said causing the set of one or more attribute values to be installed on the security gateway comprises:
 transmitting the set of one or more attribute values to the security gateway.

4. The method of claim 1, further comprising:
 causing one or more different honey tokens, based upon a time schedule, to be placed on the client end station.

5. The method of claim 4, further comprising:
 causing, responsive to receiving the set of one or more packets that include the honey token, an estimated time that the client end station was compromised to be presented to a user, wherein the estimated time is determined based upon the honey token and the time schedule.

6. The method of claim 1, wherein the honey token comprises at least one of:
 a database name;
 a database table name; and
 a database query.

7. The method of claim 1, wherein the honey token comprises at least one of:
 a filename; and
 a file system path.

8. The method of claim 1, wherein the honey token comprises at least one of:
 a URI; and
 a cookie value of a HyperText Transfer Protocol (HTTP) cookie.

9. The method of claim 1, wherein the honey token comprises a network address.

10. The method of claim 1, wherein the set of one or more attribute values comprises a part of the honey token that is less than all of the honey token.

11. A system for setting a trap to detect if an intruder has compromised a client end station in an attempt to gain unauthorized access to enterprise data provided by a server executing on a server end station, wherein the client end station comprises a set of one or more user data files storing user data accessed through a set of one or more applications and further comprises a configuration repository storing application configuration data used by the set of one or more applications to configure the operation of the set of one or more applications, the system comprising:

a reverse honey token management module, distinct from the client end station, that,
  causes a honey token to be placed on the client end station secluded within the application configuration data stored in the configuration repository, by transmission of a custom generation program to the client end station, wherein the client end station executes the custom generation program to create the honey token, wherein the configuration repository is at least one of a data source name (DSN) data structure, a Windows registry database, an application configuration file, and a local storage of a web browser, wherein the honey token is one or more of metadata and instructions indicating how one or more of the set of one or more applications can seemingly access the enterprise data provided by the server, wherein the honey token is invalid and does not allow access to any of the enterprise data provided by the server, wherein the server is unaware of the honey token, and wherein the honey token is a reverse honey token in that it is placed on the client end station and not on the server, and
  causes a set of one or more attribute values to be installed on a security gateway to cause the security gateway to utilize a security rule to detect an attempted use of the honey token to gain access to the enterprise data provided by the server; and the security gateway implemented in an electronic device and coupled between the client end station and the server that,
  monitors network traffic, using the security rule and the set of one or more attribute values, for the attempted use of the honey token, and
  generates an alert when a set of one or more packets that include the honey token are received.

12. The system of claim 11, wherein the security rule further causes the security gateway to:
    block the set of one or more packets from reaching the server by not forwarding the set of one or more packets toward the server.

13. The system of claim 11, wherein the reverse honey token management module causes the set of one or more attribute values to be installed on the security gateway by being configured to:
    transmit the set of one or more attribute values to the security gateway.

14. The system of claim 11, wherein the reverse honey token management module is further configured to:
    cause one or more different honey tokens, based upon a time schedule, to be placed on the client end station.

15. The system of claim 14, wherein the security gateway is further configured to:
    cause, responsive to receiving the set of one or more packets that include the honey token, an estimated time that the client end station was compromised to be presented to a user, wherein the estimated time is determined based upon the honey token and the time schedule.

16. The system of claim 11, wherein the honey token comprises at least one of:
    a database name;
    a database table name; and
    a database query.

17. The system of claim 11, wherein the honey token comprises at least one of:
    a filename; and
    a file system path.

18. The system of claim 11, wherein the honey token comprises at least one of:
    a URI; and
    a cookie value of a HyperText Transfer Protocol (HTTP) cookie.

19. The system of claim 11, wherein the honey token comprises a network address.

20. The system of claim 11, wherein the set of one or more attribute values comprises a part of the honey token that is less than all of the honey token.

21. A non-transitory computer-readable storage medium comprising instructions for one or more processors, which, when executed by the one or more processors, cause the one or more processors to perform operations for setting a trap to detect if an intruder has compromised a client end station in an attempt to gain unauthorized access to enterprise data provided by a server executing on a server end station, wherein the client end station comprises a set of one or more user data files storing user data accessed through a set of one or more applications and further comprises a configuration repository storing application configuration data used by the set of one or more applications to configure the operation of the set of one or more applications, wherein the operations for setting a trap comprise:
    causing a honey token to be placed on the client end station secluded within the application configuration data stored in the configuration repository, wherein the configuration repository is at least one of a data source name (DSN) data structure, a Windows registry database, an application configuration file, and a local storage of a web browser, wherein the honey token is one or more of metadata and instructions indicating how one or more of the set of one or more applications can seemingly access the enterprise data provided by the server, wherein the honey token is invalid and does not allow access to any of the enterprise data provided by the server, wherein the server is unaware of the honey token, and wherein the honey token is a reverse honey token in that it is placed on the client end station and not on the server, wherein the causing the honey token includes transmitting a custom generation program to the client end station, and wherein the client end station executes the custom generation program to create the honey token; and
    causing a set of one or more attribute values to be installed on a security gateway coupled between the client end station and the server, wherein the set of one or more attribute values are to be utilized for a security rule that causes the security gateway to,
        monitor network traffic for attempted use of the honey token to gain access to the enterprise data provided by the server, and
        generate an alert when a set of one or more packets that include the honey token are received.

22. The non-transitory computer-readable storage medium of claim 21, wherein the security rule further causes the security gateway to:
    block the set of one or more packets from reaching the server by not forwarding the set of one or more packets toward the server.

23. The non-transitory computer-readable storage medium of claim 21, wherein said causing the set of one or more attribute values to be installed on the security gateway comprises:
    transmitting the set of one or more attribute values to the security gateway.

24. The non-transitory computer-readable storage medium of claim 21, wherein the operations for setting a trap further comprise:
    causing one or more different honey tokens, based upon a time schedule, to be placed on the client end station.

25. The non-transitory computer-readable storage medium of claim 24, wherein the operations for setting a trap further comprise:
    causing, responsive to receiving the set of one or more packets that include the honey token, an estimated time that the client end station was compromised to be presented to a user, wherein the estimated time is determined based upon the honey token and the time schedule.

26. The non-transitory computer-readable storage medium of claim 21, wherein the honey token comprises at least one of:
    a database name;
    a database table name; and
    a database query.

27. The non-transitory computer-readable storage medium of claim 21, wherein the honey token comprises at least one of:
    a filename; and
    a file system path.

28. The non-transitory computer-readable storage medium of claim 21, wherein the honey token comprises at least one of:
    a URI; and
    a cookie value of a HyperText Transfer Protocol (HTTP) cookie.

29. The non-transitory computer-readable storage medium of claim 21, wherein the honey token comprises a network address.

30. The non-transitory computer-readable storage medium of claim 21, wherein the set of one or more attribute values comprises a part of the honey token that is less than all of the honey token.

* * * * *